United States Patent
Joo et al.

(10) Patent No.: US 7,275,388 B2
(45) Date of Patent: Oct. 2, 2007

(54) INDOOR UNIT FOR AIR CONDITIONER

(75) Inventors: Chang-Hwoi Joo, Changwon-shi (KR);
Seong-Min Kang, Jinhae-shi (KR)

(73) Assignee: LG Electronics Inc., Seoul (KR)

( * ) Notice: Subject to any disclaimer, the term of this patent is extended or adjusted under 35 U.S.C. 154(b) by 346 days.

(21) Appl. No.: 10/475,170

(22) PCT Filed: Dec. 6, 2001

(86) PCT No.: PCT/KR01/02107

§ 371 (c)(1),
(2), (4) Date: Oct. 17, 2003

(87) PCT Pub. No.: WO02/086393

PCT Pub. Date: Oct. 31, 2002

(65) Prior Publication Data

US 2005/0097915 A1    May 12, 2005

(30) Foreign Application Priority Data

Apr. 20, 2001  (KR) .............................. 2001-21436
Jul. 31, 2001  (KR) .............................. 2001-46403

(51) Int. Cl.
*F25D 17/04* (2006.01)
(52) U.S. Cl. .......................................... 62/408; 62/285
(58) Field of Classification Search .................. 62/408, 62/285, 262, 259.1; 165/104.34, 48.1
See application file for complete search history.

(56) References Cited

U.S. PATENT DOCUMENTS

| | | | | |
|---|---|---|---|---|
| 4,386,651 A | * | 6/1983 | Reinhard | ............... 165/104.33 |
| 4,727,728 A | * | 3/1988 | Brown | ........................ 62/244 |
| 6,637,232 B1 | * | 10/2003 | Harshberger et al. | ......... 62/285 |

FOREIGN PATENT DOCUMENTS

| | | |
|---|---|---|
| EP | 0984227 A | 3/2000 |
| EP | 1008814 A1 | 6/2000 |
| EP | 1041351 A1 | 10/2000 |
| EP | 1079184 A | 2/2001 |
| JP | 1-181036 A | 7/1989 |
| JP | 02-136628 A | 5/1990 |
| JP | 2-259358 A | 10/1990 |
| JP | 3-17461 A | 1/1991 |
| JP | 05-187706 A | 7/1993 |
| JP | 06-002875 A | 1/1994 |
| JP | 07-098129 A | 4/1995 |
| JP | 09-210401 A | 8/1997 |
| JP | 10-122588 A | 5/1998 |
| JP | 10-213329 A | 8/1998 |
| JP | 2000234760 A | 8/2000 |
| JP | 2000346392 A | 12/2000 |
| JP | 2001065909 A | 3/2001 |

* cited by examiner

*Primary Examiner*—Melvin Jones
(74) *Attorney, Agent, or Firm*—Birch, Stewart, Kolasch & Birch, LLP

(57) ABSTRACT

Indoor unit of air conditioner of the present invention includes air discharge units at left, right, and bottom of an outer case of the indoor unit oriented to blow air in forward outer sides, to prevent air blow to a suction side, thereby making air circulation smooth and fast air conditioning, and preventing infiltration of foreign matter in ordinary times to keep a tidy outer appearance because air suction, and the discharge units are only opened during operation of the air conditioner.

36 Claims, 23 Drawing Sheets

INDOOR UNIT FOR AIR CONDITIONER

This application is the national phase under 35 U.S.C. § 371 of PCT International Application No. PCT/KR01/02107 which has an International filing date of Dec. 6, 2001, which designated the United States of America.

TECHNICAL FIELD

The present invention relates to an air conditioner, and more particularly, to an indoor unit of an air conditioner enabling to suck and blow the chill of the air smoothly and air-condition a room evenly among all.

BACKGROUND ART

FIG. 1 and FIG. 2 illustrate a constitution of an indoor unit of an air conditioner according to a related art. Referring to the drawings, a casing 1 forms an exterior of an indoor unit.

The casing 1 has a flat-rectangular shape so that each length of top/bottom and right/left is relatively greater than a width of front/rear.

An intake part 3 is formed at a front face of the casing 1 so s to become a path through which an air in an air-conditioned space is sucked inside the casing 1.

A heat exchanger 5 is installed at a rear side of the intake part 3. The heat exchanger 5 exchanges heat between a refrigerant of a heat exchange cycle and the air sucked in through the intake part 3 in the air-conditioned space.

Such a heat exchanger 5 has a rectangular shape so as to correspond to the intake part 3 in size.

An air vent 6 is formed at a center of the heat exchanger 5 so as to prevent interference between a motor 7 and a turbofan 9 which will be explained in the following.

A motor 7 is installed at an inner rear side of the casing 1.

A rotating shaft of the motor 7 is installed in a direction facing from a rear side to a front side of the casing 1, and a turbofan 9 is installed at the rotating shaft. The turbofan 9 is a part providing a motive power for a flow of air inside the indoor unit. The turbofan 9 sucks an air in a direction of the rotating shaft from the front side, and then blows the sucked air in a centrifugal direction.

Blow outlets 11 are formed at upper, lower, left, and right sides of the casing 1 so as to blow the air blown by the turbofan 9 into the air-conditioned space.

Blow outlet vanes 13 are formed at the blow outlets 11 so as to adjust directions of the air blown from the blow outlets 11, respectively.

Meanwhile, an orifice 15 is installed between the heat exchanger 5 and turbofan 9, whereby an orifice hole is formed at a center of the orifice 15 so as to guide the air having passed the heat exchanger 5 to the turbofan 9.

Operation of the above-constituted indoor unit of the air conditioner according to the related art is explained as follows.

Once the air conditioner is driven, the heat exchange cycle starts to operate so that the refrigerant, which is relatively cold, is transferred to the heat exchanger 5.

And, the turbofan 9 revolves by the motor 7 so as to suck the air in the air-conditioned space.

Namely, the turbofan 9 revolves so that the air in the air-conditioned space is sucked inside the casing 1 through the intake part 3.

Moreover, the air sucked through the intake part 3 undergoes heat-exchange through the heat exchanger 5 so as to become a chilly air having a relatively low temperature.

The chilly air generated from the heat exchanger 5 is sucked in the turbofan 9 so as to be blown in the centrifugal direction of the turbofan 9.

The air blown from the turbofan 9 is blown into the air-conditioned space through the blow outlets 11 formed at the upper, lower, left, and right sides of the casing 1.

In this case, the blow outlet vanes 13 of the blow outlets 11 become open so as to adjust the blow directions of the chilly air which is being blown, respectively.

Yet, the indoor unit of the air conditioner according to the related art has the following problems.

First of all, there are four blow outlets 11 formed at the upper, lower, left, and right sides of the casing 1 in the indoor unit according to the related art, whereby the chilly air is blown in four directions.

Yet, a relatively cold air becomes distributed at a lower side as a characteristic of airflow in general.

Hence, the chilly air blown through the blow outlet 11 formed at the upper side of the casing 1 becomes to sink toward the front side of the casing 1 so as to be sucked inside the indoor unit again through the intake part 3.

Thus, an efficiency of the air conditioner is reduced.

Moreover, the airflow, which is constituted in a manner that the air blown in an upper direction of the casing 1 is sucked again in the intake part 3, interrupts an entire air conditioning in a room so as to being about a design failure. And, a temperature of the air sucked through the intake part 3 becomes lower than a real temperature in the room so that the air conditioner fails to attain a precise data. Hence, the entire room is unable to be air-conditioned promptly.

And, the intake part 3 is always open regardless of any operation status of the air conditioner.

Namely, a predetermined portion of the intake part 3 should be open so as not only to let the air pass through but to prevent a user's hand or other thing from being inserted therein. Such a predetermined portion maintains to be open all the time. Hence, dusts or particles in the room come into penetrating the intake part 3.

Thus, a filter (not shown in the drawing) installed between the intake part 3 and heat exchanger 5 should be cleaned more often.

Besides, the opened intake part 3 provides a bad impression in aesthetic appearance.

Moreover, it is difficult to attach/detach the filter of the related art. Namely, in order to exchange the filter, an intake grill (not shown in the drawing) should be separated from the indoor unit so as to be troubled with a filter exchange work.

And, the filter has a function of filtering dust only, thereby being unable to deodorize the air.

Moreover, the related art fails to include a display unit displaying an operation status of the air conditioner, thereby being inconvenient for a user to be informed of the operation status of the air conditioner.

Meanwhile, the orifice 15 partitioning a space between the heat exchanger 5 and turbofan occupies a relatively large rectangular area to be easily distorted so as to interrupt the precise airflow inside the indoor unit.

Specifically, if an edge of the orifice 15 fails to be sealed precisely with the casing 1, the air blown through the turbofan 9 comes into leakage in part.

Besides, the blow outlets 11 are formed at four sides of the casing 1 and the area of the rear face of the casing 1 is equal to that of the front face, whereby a mechanical strength of the casing 1 is weak.

And, the casing 1 having a relatively large area of a back face is easily bent so as to be unable to support strongly components attached thereto.

Finally, blow louvers 14 are built in one body of the blow vanes 13 installed at the blow outlets 11 so as be heavy. Hence, a relatively heavy load is applied to the motor in order to drive the blow vanes 13.

Besides, when the blow vanes 13 are open, the air leaks toward a rear side of an outer surface of the casing. Hence, a flow of the air fails to be as designed.

DISCLOSURE OF THE INVENTION

Accordingly, the present invention is directed to an indoor unit of an air conditioner that substantially obviates one or more of the problems due to limitations and disadvantages of the related art.

An object of the present invention is to provide an indoor unit of an air conditioner enabling to clearly separate a flow of an air sucked in the air conditioner from that of the air blown from the air conditioner.

Another object of the present invention is to provide an indoor unit of an air conditioner enabling to perform a faster air conditioning.

Another object of the present invention is to provide an indoor unit of an air conditioner enabling to prevent particles from penetrating inside the indoor unit.

Another object of the present invention is to provide an indoor unit of an air conditioner enabling to make an exterior of the indoor unit more beautiful.

Another object of the present invention is to provide an indoor unit of an air conditioner enabling to facilitate easy attachment/detachment of a filter.

Another object of the present invention is to provide an indoor unit of an air conditioner having a filter enabling to remove a smell as well as a dust.

Another object of the present invention is to provide an indoor unit of an air conditioner enabling to simplify components constituting the air conditioner.

Another object of the present invention is to provide an indoor unit of an air conditioner having a display unit displaying an operating status of the air conditioner using light more efficiently.

Another object of the present invention is to provide an indoor unit of an air conditioner having a slim grill louver, which opens/closes an intake part conveying an air inside the indoor unit, with efficient operation.

Another object of the present invention is to provide an indoor unit of an air conditioner having a simplified and strengthened orifice partitioning a space between a heat exchanger and a turbofan.

Another object of the present invention is to provide an indoor unit of an air conditioner having a strengthened outer case constructing an exterior of the indoor unit.

A further object of the present invention is to provide an indoor unit of an air conditioner including a blow unit, of which strength is reinforced, having reduced power consumption.

Another further object of the present invention is to provide an indoor unit of an air conditioner enabling to guide precisely a flow of an air blown through a blow unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an indoor unit of an air conditioner according to the present invention includes an outer case having components installed inside, a front panel installed at a front side of the outer case and having an air intake part enabling to be opened/closed, and blow units installed in right, left, and lower directions of the outer case respectively so as to blow a heat-exchanged air to a space for air-conditioning.

Preferably, the blow units are installed at right, left, and lower sides of the outer case and each of the blow units includes a blow grill forming a frame, a blow louver driven by an additional driving source so as to open/close the blow outlet selectively and guide a blown air to a front outside of the outer case, and a blow vane guiding the blown air from the blow outlet so that the blow air turns in one direction overall.

More preferably, the blow vane divides the blow outlet along its length direction.

More preferably, the blow vane is built in one body with the blow grill.

More preferably, an inner face of a louver body of the blow louver has a predetermined curvature from upper to lower stream portions of the louver body, and a vertical hem plane portion is formed at a vertical hem outer face of the louver body.

More preferably, a shut-off portion is formed at the outer face of the upper stream portion of the louver body so as to block a gap between the outer face of the louver body and the corresponding blow outlet when the blow louver is opened.

More preferably, blow unit landing spaces for receiving the blow units are formed at the sides of the outer case, respectively, and hanging pieces and hanging protrusions are formed at each of the blow grills landing at the blow unit landing spaces and inner sides of the outer case, respectively so as to assemble each of the blow units with the outer case.

More preferably, a landing rest is formed at one side of the blow grill so as to land at a landing channel formed at the outer case.

To further achieve these and other advantages and in accordance with the purpose of the present invention, an indoor unit of an air conditioner according to the present invention includes an outer case having components installed inside, a front panel installed at a front side of the outer case, at least one grill louver installed on the front panel so as to be closed/opened to suck an air of an air-conditioned space inside, blow guides installed inside the outer case so as to guide an air to blow units wherein the air is sucked inside to be heat-exchanged when the grill louver is opened, and blow units installed in right, left, and lower directions of the outer case, respectively so as to blow externally the air guided by the blow guide.

Preferably, the blow guides are installed at a base face of the outer case, and two of the blow guides are built in one body with both lower end sides of the base face and the rest blow guide is installed additionally at an upper end of the base face so as to extend long from one side to the other side.

More preferably, the blow guide at the upper end of the base face is made of Styrofoam based material so as to have a guide face having a predetermined curvature at portion confronting a blow fan.

More preferably, a lead wire landing channel is formed at each of the blow guides built in one body with the base face so as to receive a lead wire thereon.

To further achieve these and other advantages and in accordance with the purpose of the present invention, an indoor unit of an air conditioner according to the present invention includes an outer case having components installed inside, a front panel installed at a front side of the outer case, at least one grill louver installed on the front panel so as to be closed/opened to suck an air of an air-conditioned space inside, a base panel installed under the grill louver so as to be able to elevate along the front panel, the base panel used as an access path for attaching/detaching a filter installed at a rear side of the grill louver, and blow units installed at right, left, and lower sides of the outer case, respectively so as to blow the air to the air-conditioned space wherein the air is sucked inside to be heat-exchanged when the grill louver is opened.

Preferably, guide pins are formed to protrude from both upper end sides of the base panel and wherein the guide pins move along guide slots formed at the front panel, respectively so as to guide elevation of the base panel.

More preferably, guides are formed at the base and front panels, respectively so as to guide the elevation of the base panel.

Preferably, the indoor unit further includes at least one locker penetrating into back and front faces of the front panel so as to support a back face of the base panel and at least one locker loading part formed at the back face of the front panel so as to have the locker loaded thereon.

More preferably, the locker includes a support rod having one end protruding toward a front side of the front panel so as to support the base panel, a landing body built in one body with the other end of the support rod so as to land at the locker loading part, and a plurality of coupling wings built in one body with a circumference of the landing body wherein hooks are formed at vertical hems of the coupling wings so as to be coupled with the locker loading part.

More preferably, the locker loading part includes a landing space at which the landing body lands, a locking rib formed along an inner face of a guide rib forming the landing space to correspond to a number of the coupling wings so as to fix the coupling wings thereto, and a passing hole making the support rod protrude from the front face of the front panel.

More preferably, the guide rib is formed at the back face of the base panel.

Preferably, the indoor unit further includes a display unit at the base panel, and the display unit includes a housing coupled with a back face of the base panel, at least one light source installed inside the housing so as to emit light, a light traveling globe installed on a substrate landing inside the housing and loaded on the back face of the base panel so as to transfer the light of the light source, a light guide globe installed on the substrate so as to guide the light emitted from the light source to the light traveling globe, and a light emitting part installed on the light traveling globe to be exposed to a front face of the base panel so as to provide a front side of the base panel with the light.

More preferably, the light guide globe includes a body portion having a light guide hole inside so as to have an exit of the light guide hole adhere closely to the light traveling globe and loading legs built in one body with the body portion and having hooks at vertical hems of the loading legs, respectively so as to be loaded on the substrate elastically.

More preferably, the light source is installed at each end of the light traveling globe so as to form a plurality of colors with three primary colors of light and combinations thereof to be displayed on the display unit.

To further achieve these and other advantages and in accordance with the purpose of the present invention, an indoor unit of an air conditioner includes an outer case having components installed inside, a front panel installed at a front side of the outer case, at least one grill louver installed on the front panel so as to be closed/opened to suck an air of an air-conditioned space inside, a filter installed in rear of the grill louver so as to purify the air passing through the front panel, the filter moving upward and downward along a surface of the front panel so as to be detachable, and blow units installed at right, left, and lower sides of the outer case, respectively so as to blow the air to the air-conditioned space wherein the air is sucked inside to be heat-exchanged when the grill louver is opened.

Preferably, the filter includes an intake filter part having a filter portion inside a predetermined type intake filter frame so as to filter dust by letting the air pass through the filter portion wherein the air flows from the air-conditioned space to an inside of the air conditioner and a deodorizing filter part built in one body with the intake filter frame so as to deodorize smell in the air.

More preferably, the deodorizing part includes a rear frame built in one body with the intake filter frame, a front frame installed at the rear frame detachably so as to leave a predetermined space from the rear frame, and a deodorizing portion installed between the front and rear frames for deodorization.

More preferably, in order to assemble the front and rear frames with each other, the filter further includes front and rear coupling protrusion pieces protruding from both ends of the front and rear frames so as to have selectively coupling recesses and protrusions coupled with each other, respectively and coupling cut portions and coupling pieces formed at the front and rear frames selectively so as to be coupled with each other.

More preferably, the filter is installed at an intake air vent part in the front panel and wherein a lattice type air vent frame is formed in the intake air vent part so as to support the filter.

More preferably, hanging protrusions are formed at an upper end of the intake filter frame so as to be installed at the front panel respectively, and a handle is formed at a lower end of the intake filter frame for detachment/attachment.

More preferably, a filter landing ends are formed along both ends of the intake air vent part of the front panel so as to guide to support both ends of the filter, and hanging portions are formed at positions corresponding to upper and lower ends of the filter so that one side of the filter is inserted therein to be hung.

More preferably, in order to prevent interference between the handle of the filter and a base panel installed under a front lower end of the front panel, an interference prevention part is formed at an inner upper end of the base panel.

To further achieve these and other advantages and in accordance with the purpose of the present invention, an indoor unit of an air conditioner includes an outer case having components installed inside, a front panel installed at a front side of the outer case, at least one grill louver installed on the front panel so as to be closed/opened to suck an air of an air-conditioned space inside, a grill louver driving unit opening/closing the grill louver in accordance with an operation status of the air conditioner, and blow units installed at right, left, and lower sides of the outer case, respectively so as to blow the air to the air-conditioned space wherein the air is sucked inside to be heat-exchanged when the grill louver is opened.

Preferably, the grill louver driving unit includes a motor providing a driving force for driving the grill louver, a gear housing installed at the front panel so as to have a landing space inside wherein the motor is loaded on the gear housing, a driving gear installed in the gear housing so as to be driven by the driving force of the motor, a rack gear bar landing at the landing space of the gear housing so as to operate by receiving the driving force through the driving gear, and at least one driven gear installed at the gear housing and gearing into the rack gear bar so as to transfer the driving force of the motor to the grill louver.

More preferably, the driven gear is a circular arc type gear having teeth on a partial section thereof.

To further achieve these and other advantages and in accordance with the purpose of the present invention, an indoor unit of an air conditioner includes an outer case having components installed inside, a front panel installed at a front side of the outer case, at least one grill louver installed on the front panel so as to be closed/opened to suck an air of an air-conditioned space inside, blow guides installed inside the outer case so as to guide the air to blow units wherein the air is sucked inside to be heat-exchanged when the grill louver is opened, a filter installed in rear of the grill louver so as to purify the air passing through the front panel, the filter moving upward and downward along a surface of the front panel so as to be detachable, a base panel installed under the grill louver so as to be able to elevate along the front panel, the base panel used as an access path for attaching/detaching the filter installed in rear of the grill louver, and blow units installed at right, left, and lower sides of the outer case, respectively so as to blow the air to the air-conditioned space wherein the air is sucked inside to be heat-exchanged when the grill louver is opened.

Preferably, the indoor unit further includes a grill louver driving unit for opening/closing the grill louver automatically.

More preferably, the grill louver driving unit includes a motor providing a driving force for driving the grill louver, a gear housing installed at the front panel so as to have a landing space inside wherein the motor is loaded on the gear housing, a driving gear installed in the gear housing so as to be driven by the driving force of the motor, a rack gear bar landing at the landing space of the gear housing so as to operate by receiving the driving force through the driving gear, and at least one driven gear installed at the gear housing and gearing into the rack gear bar so as to transfer the driving force of the motor to the grill louver.

The indoor unit of the air conditioner according to the present invention is characterized in that a flow of one air blown from the indoor unit is surely separated from that of the other air sucked in the indoor unit. Therefore, the present invention enables to achieve a faster air conditioning, prevent external particles from penetrating inside the indoor unit, and have a beautiful exterior thereof.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
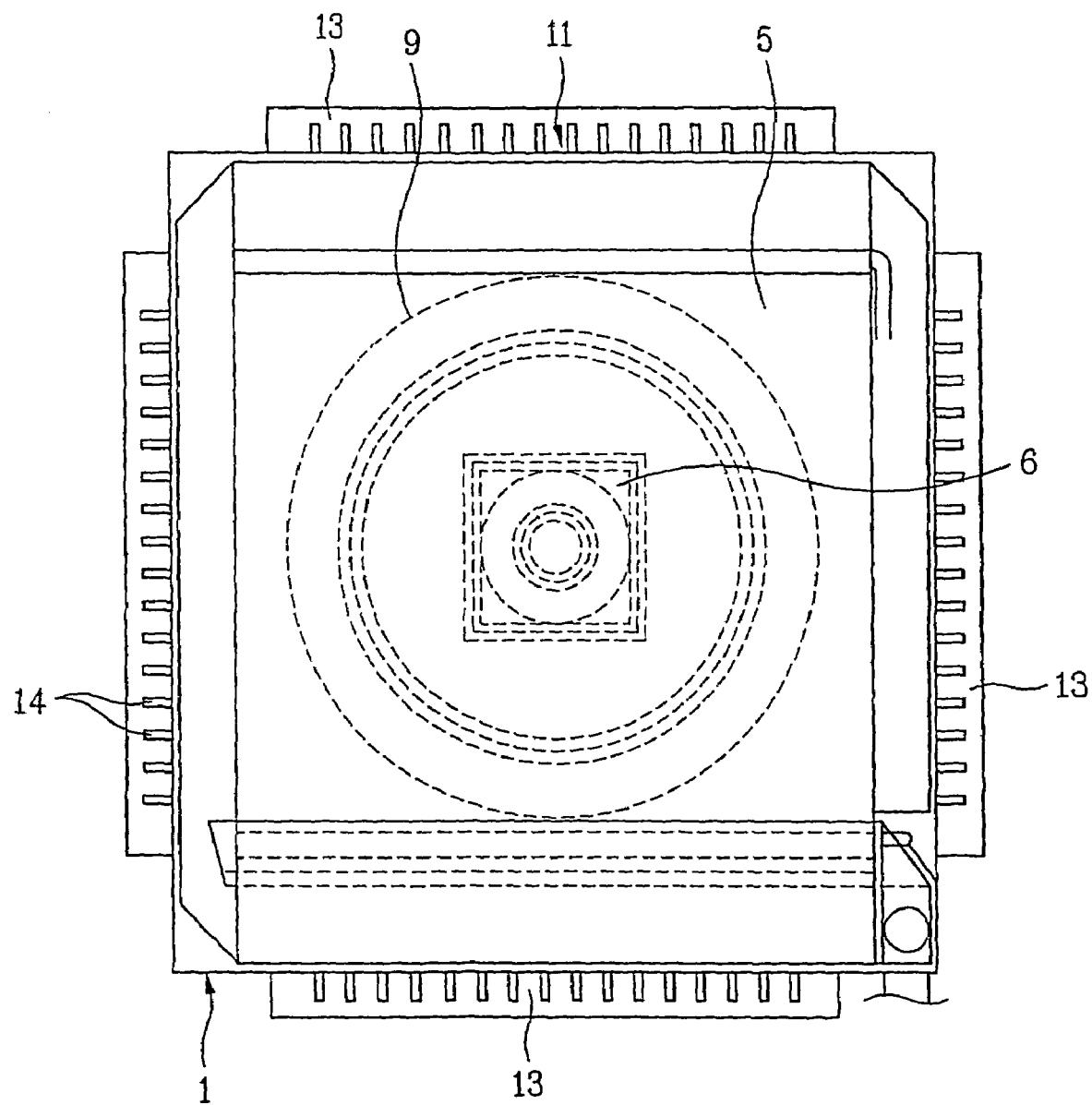
FIG. 1 illustrates a front view of an indoor unit of an air conditioner according to a related art.
Figure 2:
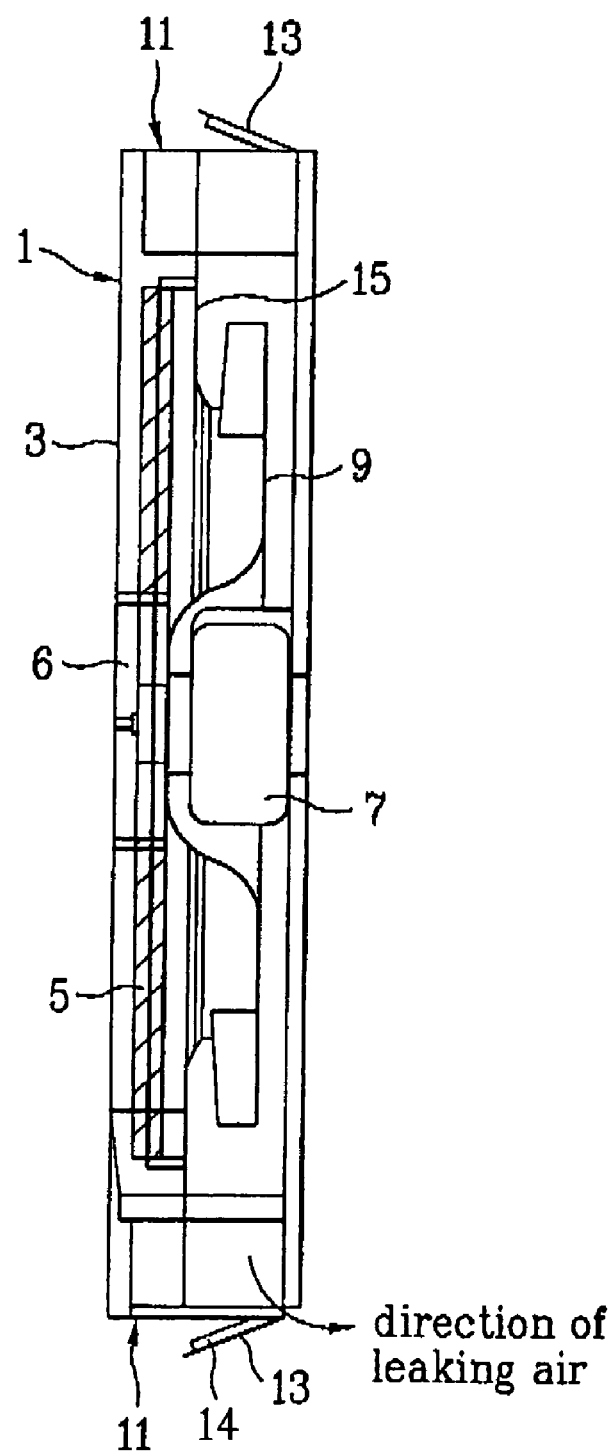
FIG. 2 illustrates a lateral cross-sectional view of an indoor unit of an air conditioner according to a related art.
Figure 3:
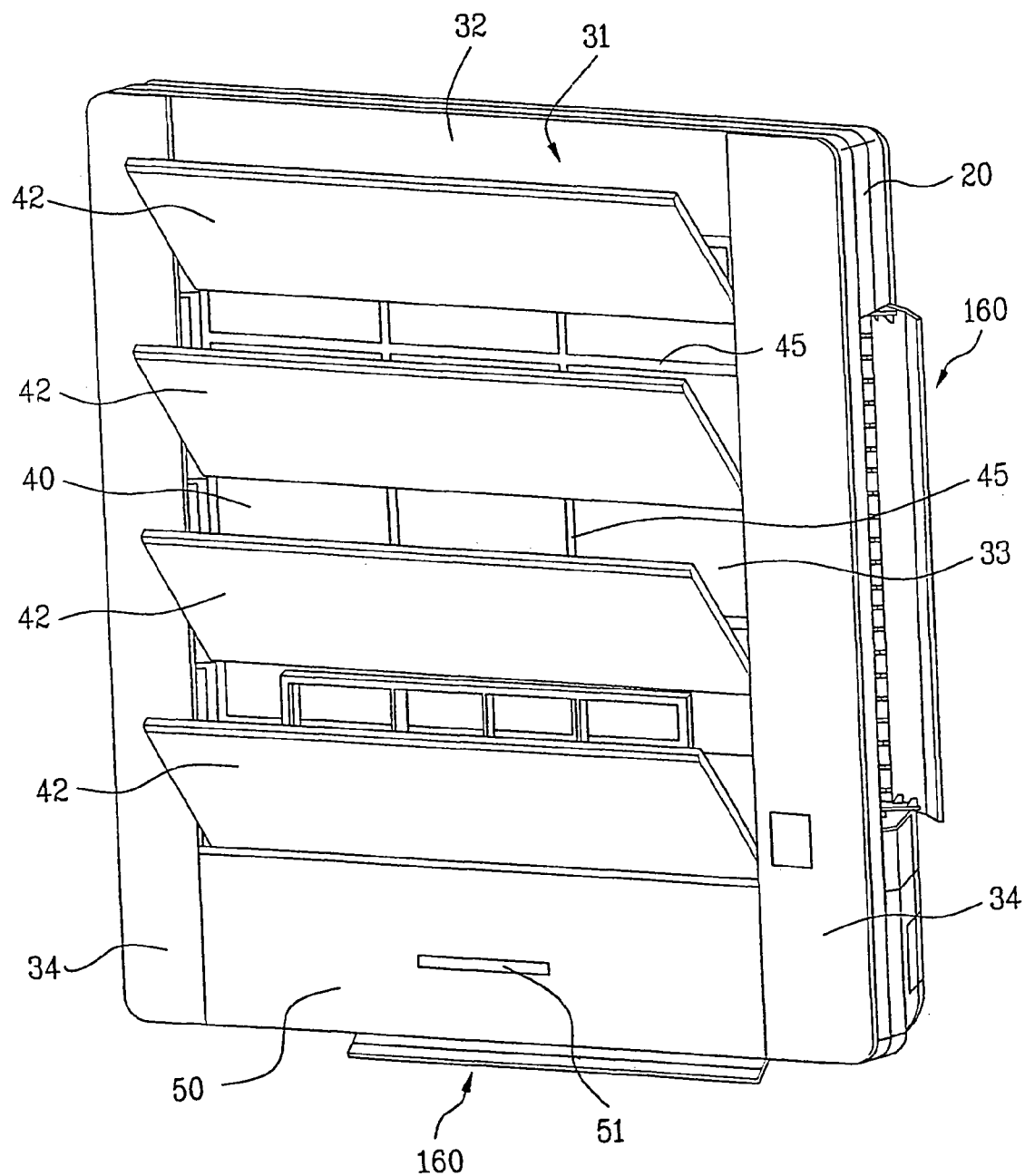
FIG. 3 illustrates a bird's-eye view of an exterior of an indoor unit of an air conditioner according to a preferred embodiment of the present invention.
Figure 4:
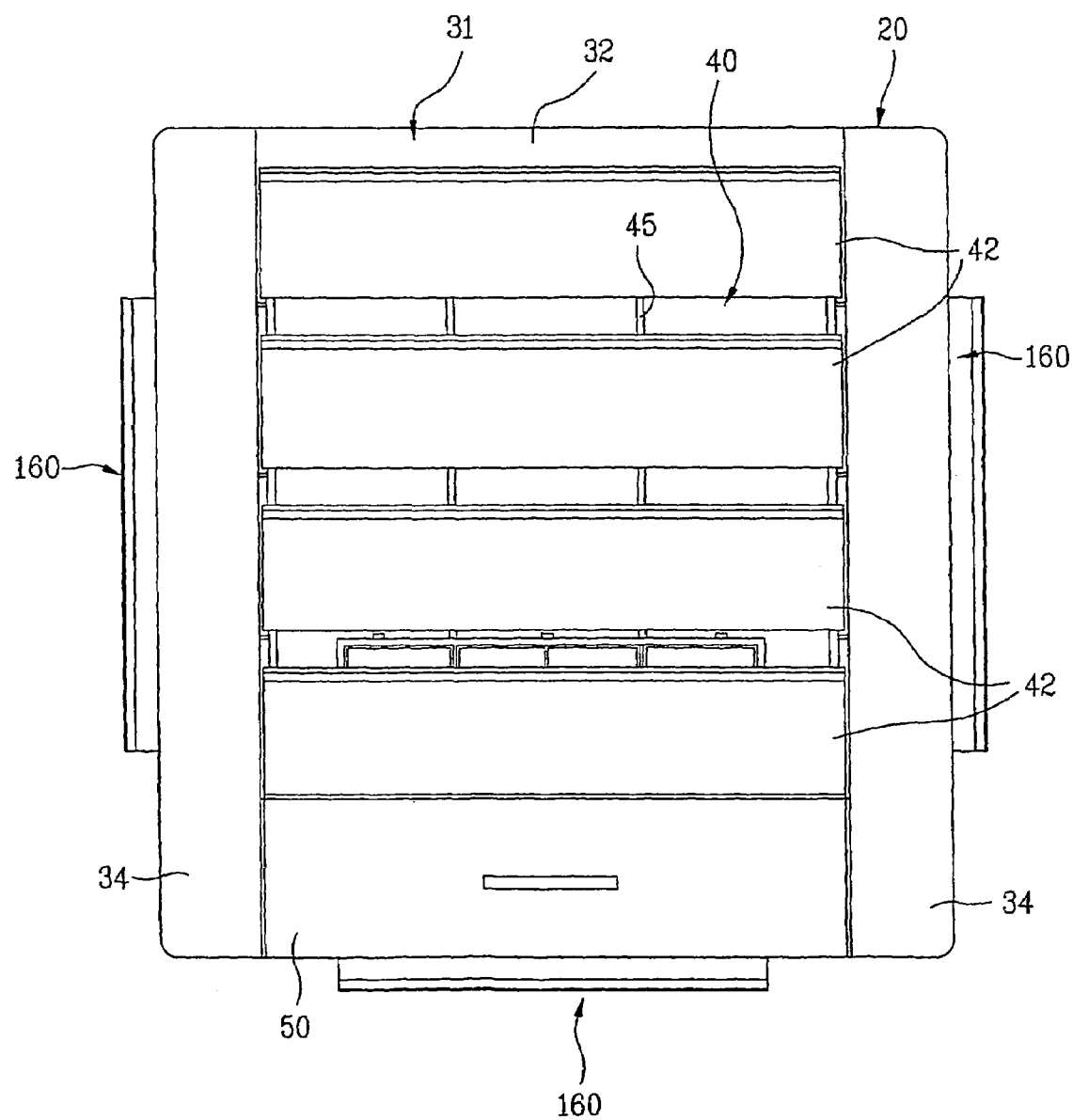
FIG. 4 illustrates a front view of an exterior of an indoor unit of an air conditioner according to an embodiment of the present invention.

Referring to FIG. 3 and FIG. 4, an outer case 20 forms an exterior of an indoor unit according to an embodiment of the present invention.

The outer case 20 is formed to have a flat hexahedral shape. And, a front panel 31 is installed at a front face of the outer case 20 so as to cover a space formed inside the outer case 20.

Figure 5:
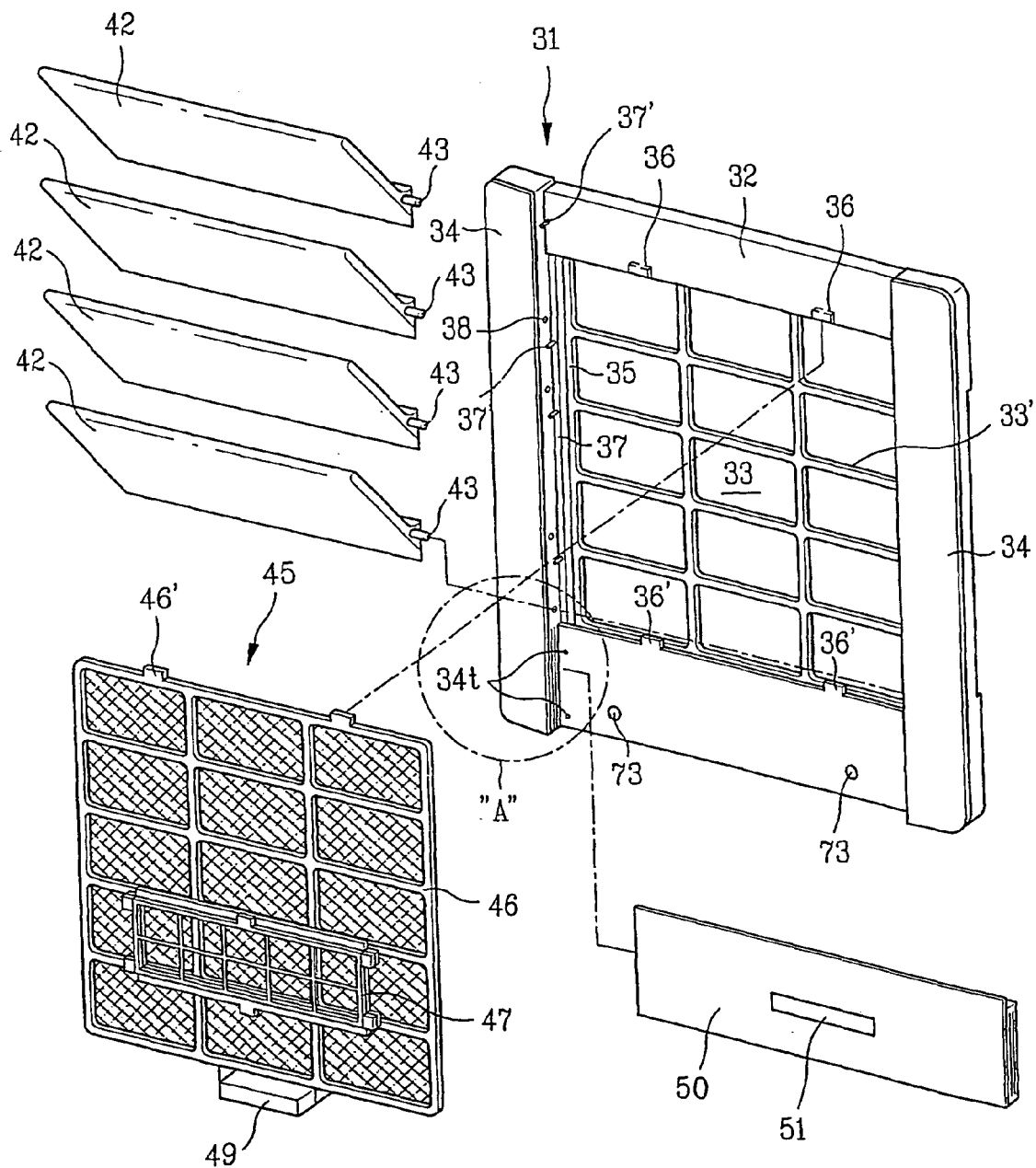
FIG. 5 illustrates a disassembled bird's-eye view of a front panel and peripheral elements according to an embodiment of the present invention.

A detailed constitution of the front panel 31 is well shown in FIG. 5, in which a front panel body 32 is roughly rectangular. And, an intake air vent part 33 is formed to be rectangular at a center of the front panel body 32.

The intake air vent portion plays a role of a path through which an air in an air-conditioned space is sucked inside the outer case 20.

An air vent frame 33' is formed like a lattice shape under the intake air vent part 33 so as to support a filter 45 that will be explained in the following.

Deco panels 34 are installed on both sides of the front panel body 32 so as to extend between upper and lower portions of the front panel body 32, respectively.

The deco panels 34 protrude relatively farther in a front direction than the front panel body 32.

A constitution for guiding elevation of a base panel 50, which will be explained later, is formed at lower portions of confronting inner faces of the deco panels at both sides.

Figure 7:
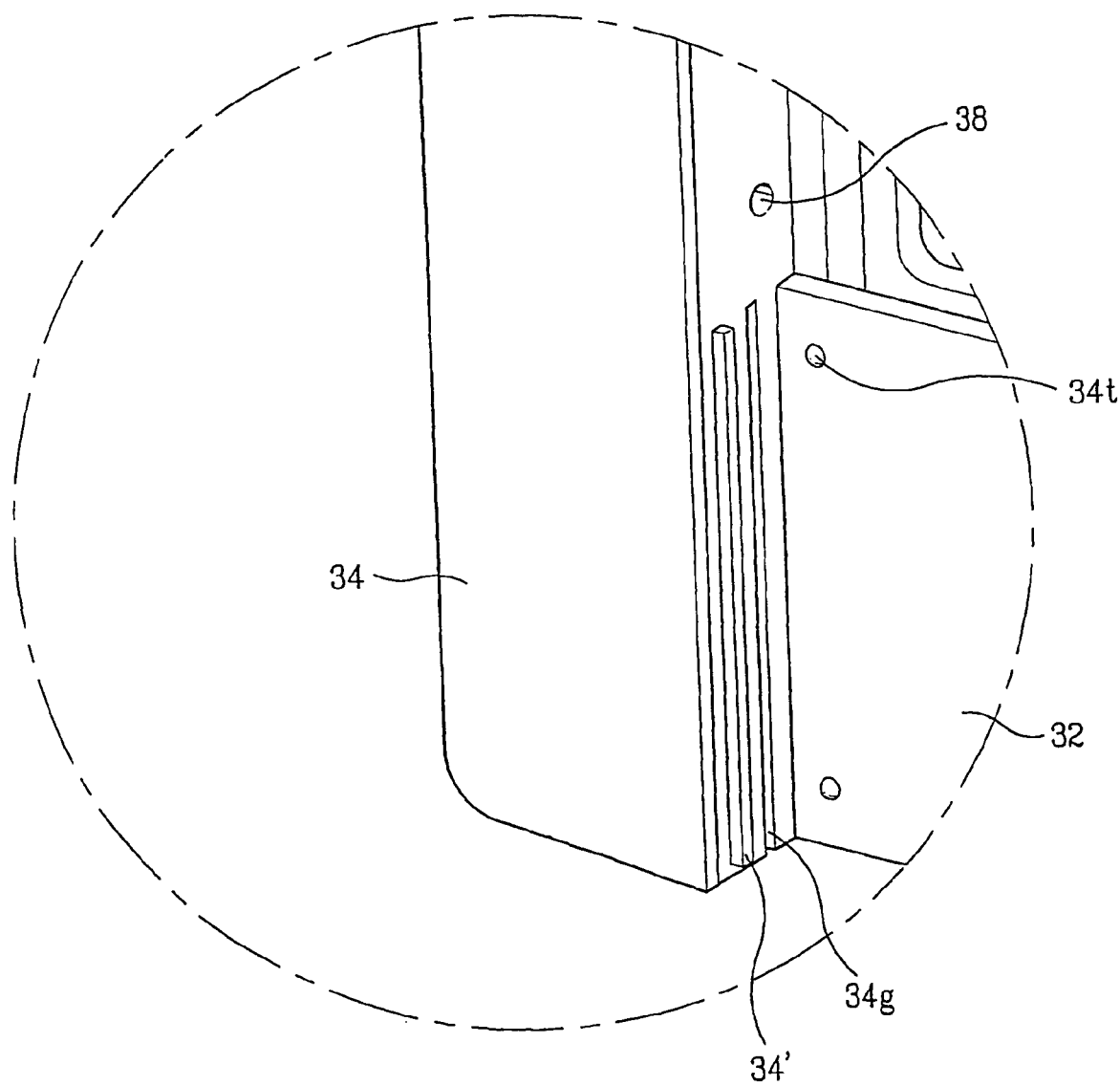
FIG. 7 illustrates a magnified bird's-eye view of a portion A in FIG. 5 so as to show a major constitution of a front panel according to an embodiment of the present invention.

Namely, as shown in FIG. 7, a guide slot 34g is formed long along each lateral side of the front panel 31 continuous with one sides of the deco panels 34.

Figure 8:
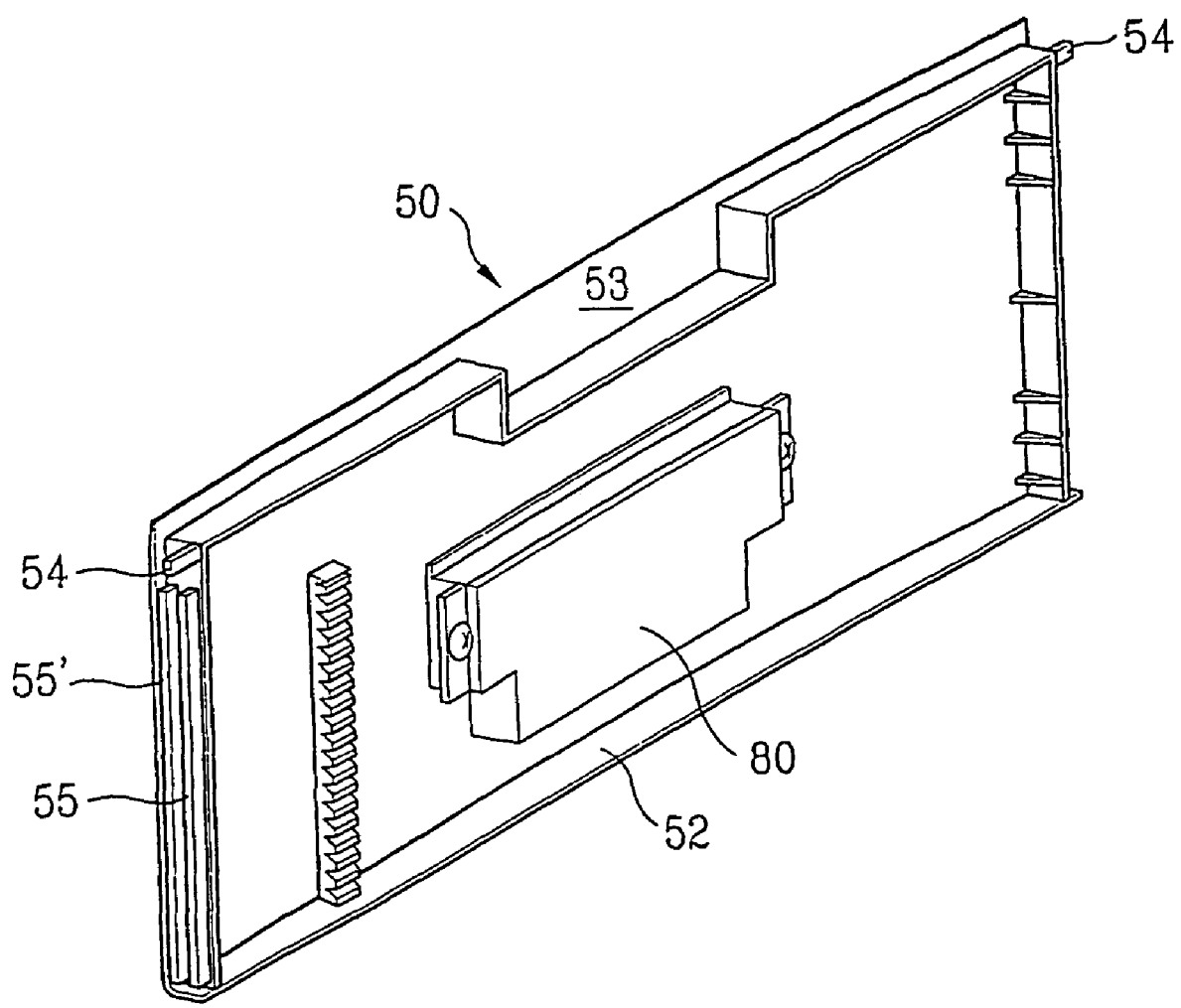
FIG. 8 illustrates a bird's-eye view of a back face of a base panel according to an embodiment of the present invention.

A guide pin 54 of a base panel 50 shown in FIG. 8 is guided along the guide slot 34g.

Moreover, a guide 34' guiding elevation of the base panel 50 protrudes in parallel with the guide slot 34g so as to be adjacent to the guide slot 34g.

And, protrusions 34t are formed at the front face of the panel body 32 so as to correspond to upper and lower ends of the guide slot 34g, respectively.

The protrusions 34t play a role in fixing the base panel 50 not to descend randomly from the front panel 31.

And, the protrusions 34t are formed at portions corresponding to the deco panels 34 at both sides of the front panel body 32.

Meanwhile, an intake part 40, as shown in FIG. 3 and FIG. 4, is formed at the front panel 31.

The intake part 40 plays a role of a path through which the air in the air-conditioned space is sucked inside the indoor unit.

A plurality of grill louvers 42 are installed at the intake part 40.

The grill louvers 42, when seen from a front side, are installed so as to extend long right to left to the front panel 31, and arranged upward and downward plurally.

And, the grill louvers, when opened for air conditioning, revolve to move centering around their lower ends respectively so that each vertical hem of the grill louvers 42 faces in an upper direction of the front side.

An open status of the grill louvers 42 is well shown in FIG. 3.

When the air conditioner stops operating, the grill louvers 42 close the intake part 40 of the front panel 31 so as not to be interconnected to the outside.

A filter 45 is installed inside the intake part 40 so as to purify an air flown inside through the intake part 40.

For reference, a filter part 46f of the filter 45 fails to be shown in FIG. 3 in order to enter numerals of the intake part 40 and intake air vent part 33.

Next, a constitution for installing the filter 45 is formed along edges of the intake air vent part 33.

First of all, referring to FIG. 5, a filter landing end 35 extends long at each end of the intake air vent part 33 so as to guide and support both ends of the filter 45.

The filter landing end 35 is formed so as to have a step difference with surroundings.

And, hanging slots 36 and hanging protrusions 36' are formed at upper and lower ends of the intake air vent part 33 so as to hang upper and lower ends of the filter 45 thereon, respectively.

And, a louver landing end 37 is formed outside each of the filter landing ends 35. A support protrusion 37' is formed on a face of each of the louver landing ends 37 so as to support each of the vertical hems of the louver grills 42 which are being closed.

The louver landing end 37 is formed to have a step difference with the corresponding filter landing end 35 so that the step difference provides an insertion space of the filter 45.

Besides, the grill louvers 42, when closed, are preferably installed so as to make a plane continuous with the deco panels 34 without generating a surface step difference.

Hinge holes 38, into which hinges of the grill louvers 42 as revolution centers penetrate, are formed at inner lateral sides of the front panel body 32 adjacent to the louver landing ends 37, respectively.

Hence, hinge shafts 43 of the grill louvers 42 are installed to fit in the hinge holes 38, respectively.

Meanwhile, a constitution of the filter 45 installed at the intake air vent part 33 of the front panel 31 is explained by referring to FIG. 6 as follows.

The filter mainly includes an intake filter frame 46 and a deodorizing filter frame 47.

First of all, the intake filter frame 46 is constituted as follows.

The intake filter frame 46 has a lattice shape so as to include a filter part 46f inside each lattice so as to filter dust.

The filter part 46f includes predetermined meshes so as to filter dust the size of which is greater than that of each of the meshes.

Figure 6:
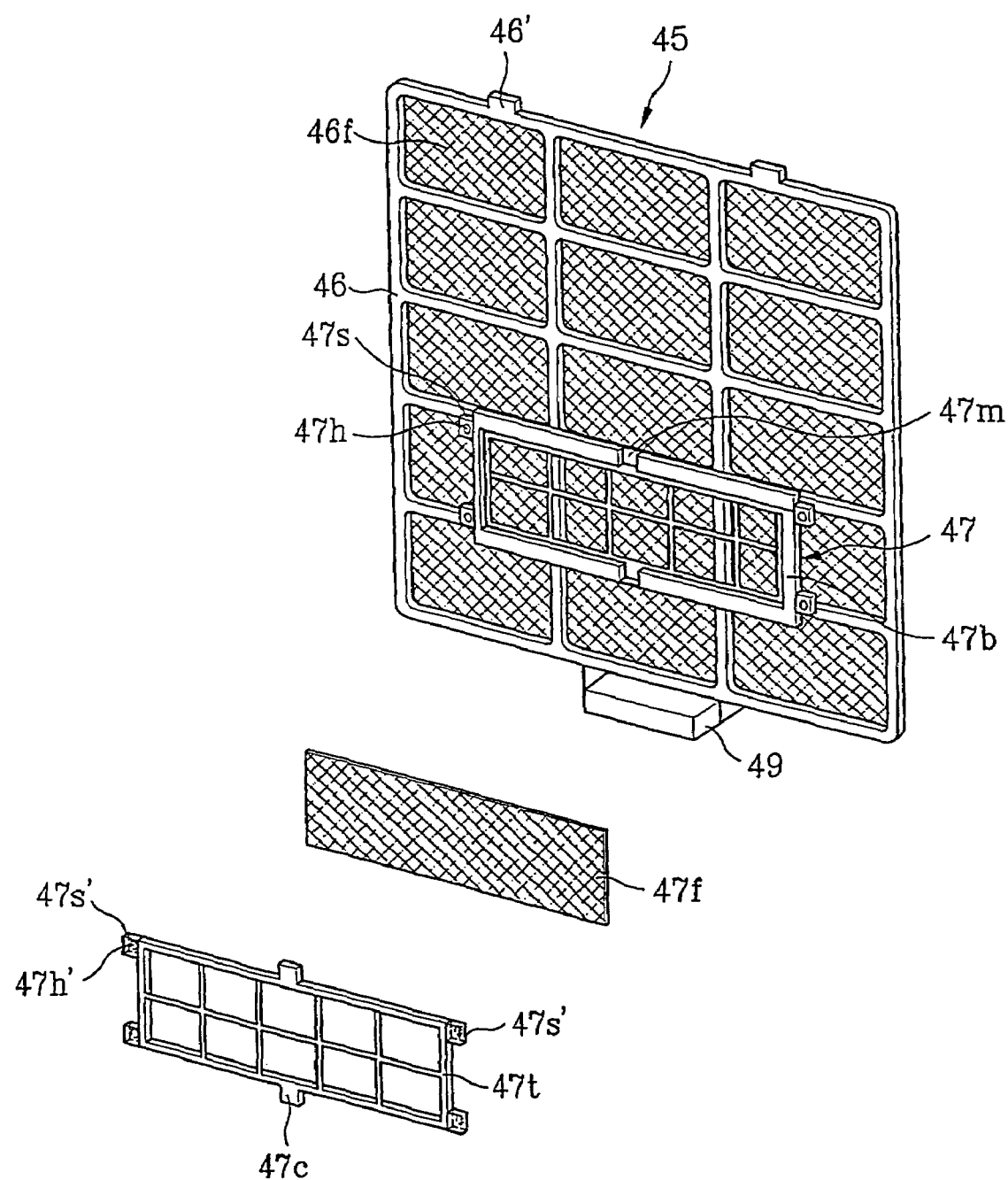
FIG. 6 illustrates a disassembled bird's-eye view of a filter according to an embodiment of the present invention.

In this case, a predetermined portion of the lattice shape of the intake filter frame 46, as shown in FIG. 6, is constituted so as to coincide with that of the air vent frame 33' of the front panel 31, whereby interference is minimized therebetween when the filter 45 is installed at the intake air vent part 33.

Hanging protrusions 46' are formed at an upper end of the intake filter frame 46 so as to be fitted into the hanging slots 36, respectively, and a handle 49 is formed at a lower end of the intake filter frame 46 so as to facilitate to handle the filter 45.

Secondly, the deodorizing filter frame 47 is built in one body with the intake filter frame 46.

Specifically, a rear frame 47b constituting the deodorizing filter frame 47 is built in one body with the intake filter frame 46.

The deodorizing filter frame 47 further includes a front frame 47t installed at the rear frame 47b so as to be detachable, and a deodorizing part 47f is placed between the rear and front frames 47b and 47t.

In this case, the rear frame 47 is formed to be rectangular so as to have the lattice shape approximately, wherein a predetermined space is provided between the rear and front frames 47b and 47t so as to receive the deodorizing part 47f.

Rear coupling protrusion pieces 47s are formed at both upper and lower ends of the rear frame 47b, and coupling recesses 47h are formed in the rear coupling protrusion pieces 47s, respectively.

And, coupling cut portions 47m are formed in the middle of the upper and lower ends of the rear frame 47b, respectively.

The deodorizing part 47f is treated with titanium oxide so as to have a function of deodorizing smell.

Such a deodorizing part 47f is placed in a space between the rear and front frames 47b and 47t.

And, the front frame 47t has a shape and size corresponding to that of the rear frame 47b, and includes front coupling protrusion pieces 47s' formed at locations corresponding to the rear coupling protrusion pieces 47s respectively and coupling protrusions 47h' formed at the front coupling protrusion pieces 47s' so as to be inserted in the coupling recesses 47h, respectively.

Of course; coupling recesses and coupling protrusions can be formed at the front and rear coupling protrusion pieces 47s and 47s', respectively.

Coupling pieces 47c are formed at the front frame 47t so as to correspond to the coupling cut portions 47m of the rear frame 47b, respectively.

Such coupling pins 47c are fitted into the coupling cut portions 47m by pressurization, respectively so as to couple the rear and front frames 47b and 47t with each other.

Meanwhile, the handle 49 is placed under the lowest grill louver 42 so as to be covered by the base panel 50.

Thus, the base panel 50 is installed under the lowest grill louver 42.

The base panel 50 ascends and descends along the front panel 31 between the deco panels 34.

A display window 51 is formed at a front center of the base panel 40 so as to display an operating status of the air conditioner.

And, a reinforcement rib 52, as shown in FIG. 8, protrudes from a circumference of the back face of the base panel 50 so as to reinforce strength of the base panel 50.

An interference prevention part 53 is formed concave in the middle of an upper portion of the reinforcement rib 52.

Hence, when the base panel 50 is loaded on the front panel 31 correctly, the interference prevention part 53 receives the handle 49 of the intake filter frame.

Meanwhile, guide pins 54 are formed to protrude from both ends of the upper side of the reinforcement rib 52, respectively.

The guide pins 54, as shown in FIG. 7, move along the guide slots 34g.

And, a pair of guides 55 are formed long on each lateral side of the reinforcement rib 52 so as to leave a predetermined interval therebetween.

In this case, a width of a guide groove 55' provided a pair of the guides 55 is formed to correspond to that of the guide 34' shown in FIG. 7.

A pair of the guides 55 get farther from each other toward vertical hems thereof so as to increase the width of the guide groove 55'. Therefore, the guide 34' enables to be fitted into the guide groove 55' between a pair of the guides 55 with ease.

And, a locker 60 is installed at the front panel 31 so as to prevent the base panel 50 from drooping or revolving when the base panel 50 descends.

Figure 9:
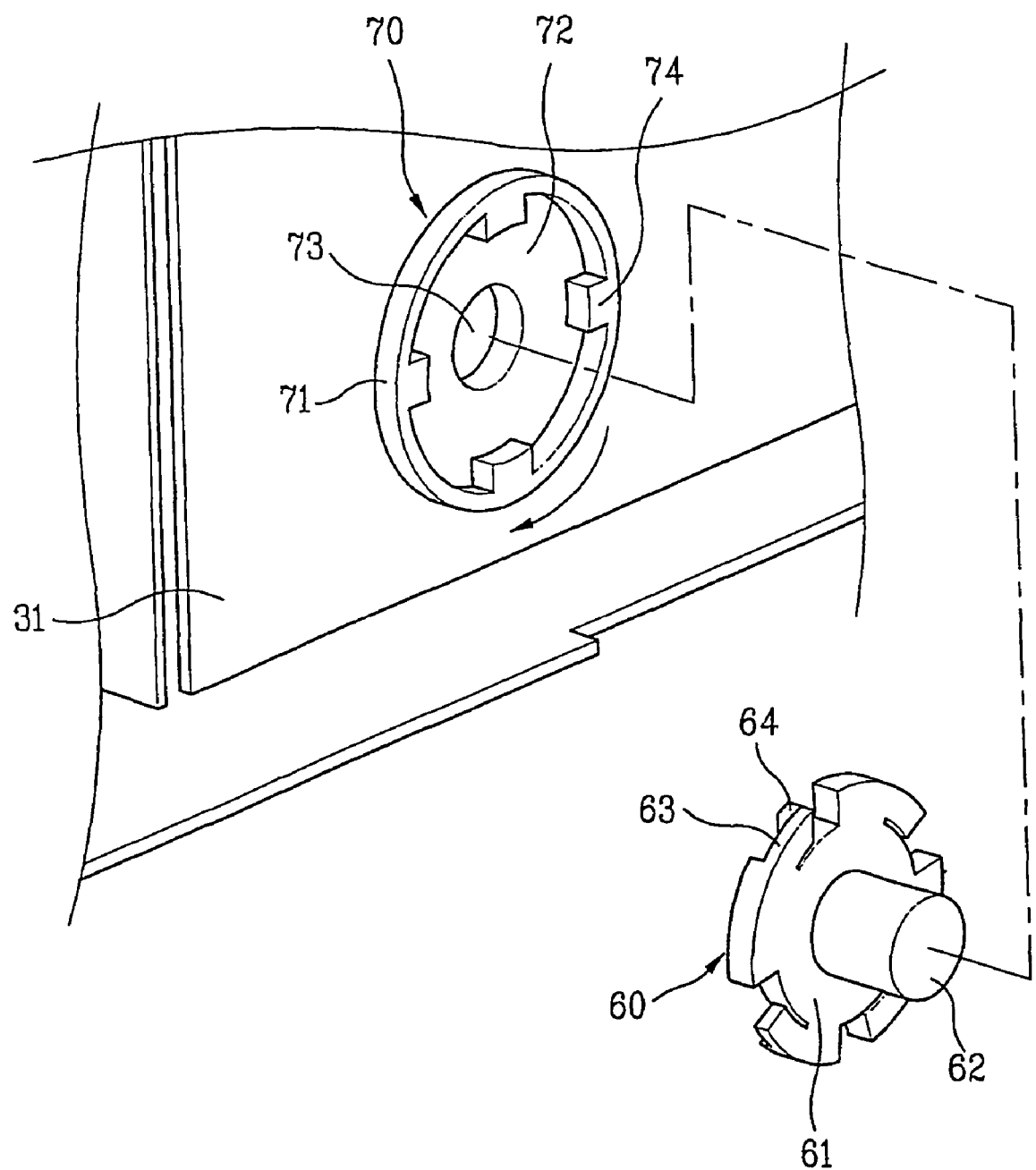
FIG. 9 illustrates a disassembled bird's eye view of a locker and its loaded structure according to an embodiment of the present invention.

A structure of the locker 60 and its loaded structure are explained by referring to FIG. 9 as follows.

The locker 60 includes a disc type landing body 61 and a support rod 62 protruding from the landing body 61 in a front direction.

The support rod 62 comes into contact with the reinforcement rib 52 of the base panel 50 so as to support the descending base panel 50.

A plurality of coupling wings 63 are formed at a circumference of the landing body 61.

Each of the coupling wings 63 is connected to the landing body 61 so as to extend along a circumference of the landing body 61, and a hook 64 is formed at a vertical hem of each of the coupling wings 63.

And, each of the coupling wings is thin unlike the landing body 61 so as to be elastic.

The hook 64 is formed to protrude in a direction opposite to the support rod 62.

And, a locker loading part 70 is formed at a lower end of the back face of the front panel 31 so that the locker 60 is loaded on the front panel 31.

Namely, a ring type guide rib 71 is formed at each side of the lower end of the back face of the front panel 31 at which the base panel lands 50 so as to have a landing space 72 inside.

The landing body 61 comes into landing inside the landing space 72.

A passing hole 73 is perforated on a center of the landing space 72 so as to penetrate into a front face of the front panel 31.

The support rod 62 protrudes out of the front panel 31 through the passing hole 73.

And, locking ribs 74 are formed in the landing space 72 along an inner face of the guide rib 71 so that the number of the locking ribs 74 corresponds to that of the coupling wings 63.

The hooks 64 of the locker 60 are snap-fitted to rear faces of the locking ribs 74, respectively.

Namely, each of the hooks 64 of the locker 60 enters a gap between the rear face of the locking rib 74 and an inner face of the landing space 72 so as to be snap-fitted thereto.

The display window 51 is installed at the center of the front face of the base panel 50 so as to display the operating status of the air conditioner, and a display nit 80 is installed at a rear side of the front face.

Constitutions of the display window 51 and display unit 80 are explained by referring to FIG. 3, FIG. 10, and FIG. 11 as follows.

First of all, the display window 51 is formed at the center of the front face of the base panel 50.

The display window 51 is formed so as to penetrate into the base panel 50.

And, coupling ribs 57 are formed at portions of the back face of the base panel 50 so as to correspond to both ends of the display window 51 in order to perform a coupling of a housing 81 that will be explained later.

And, a light traveling globe 83 is installed at the back face of the base panel 50. The light traveling globe 83 is placed long on a substrates 82 right and left when the housing 81 is loaded on the base panel 50, and is loaded on the base panel 50 by welding portions 56.

A light emitting part 84 is installed at a front face of the light traveling globe 83 corresponding to the display window 51 so as to land inside the display window 51 to emit light toward the front side of the base panel 50.

The light emitting part 84 is built in one body with the light traveling globe 83.

The light traveling globe 83 and light emitting art 84 are made of an optical material having a characteristic of delivering light effectively.

Besides, the display unit 80 is installed at the rear side of the back face of the base panel 50.

In this case, the housing 81 forms an exterior of the display unit 80.

One face of the housing 81 is open to form an opening, and the opening lands at the back face of the base panel 50.

Coupling pieces 81' for locking are formed at both lateral ends of the housing 81.

The substrate 82 lands inside the housing 81.

And, various devices and components are installed on the substrate 82 so as to supply LED with power as well as control operation of LED.

Moreover, light guide globes 90 are installed at both ends portions of the substrate 82 inside the housing 81.

The light guide globes 90 play a role in guiding light emitted from a light source 86 to the light traveling globe 83.

Figure 11:
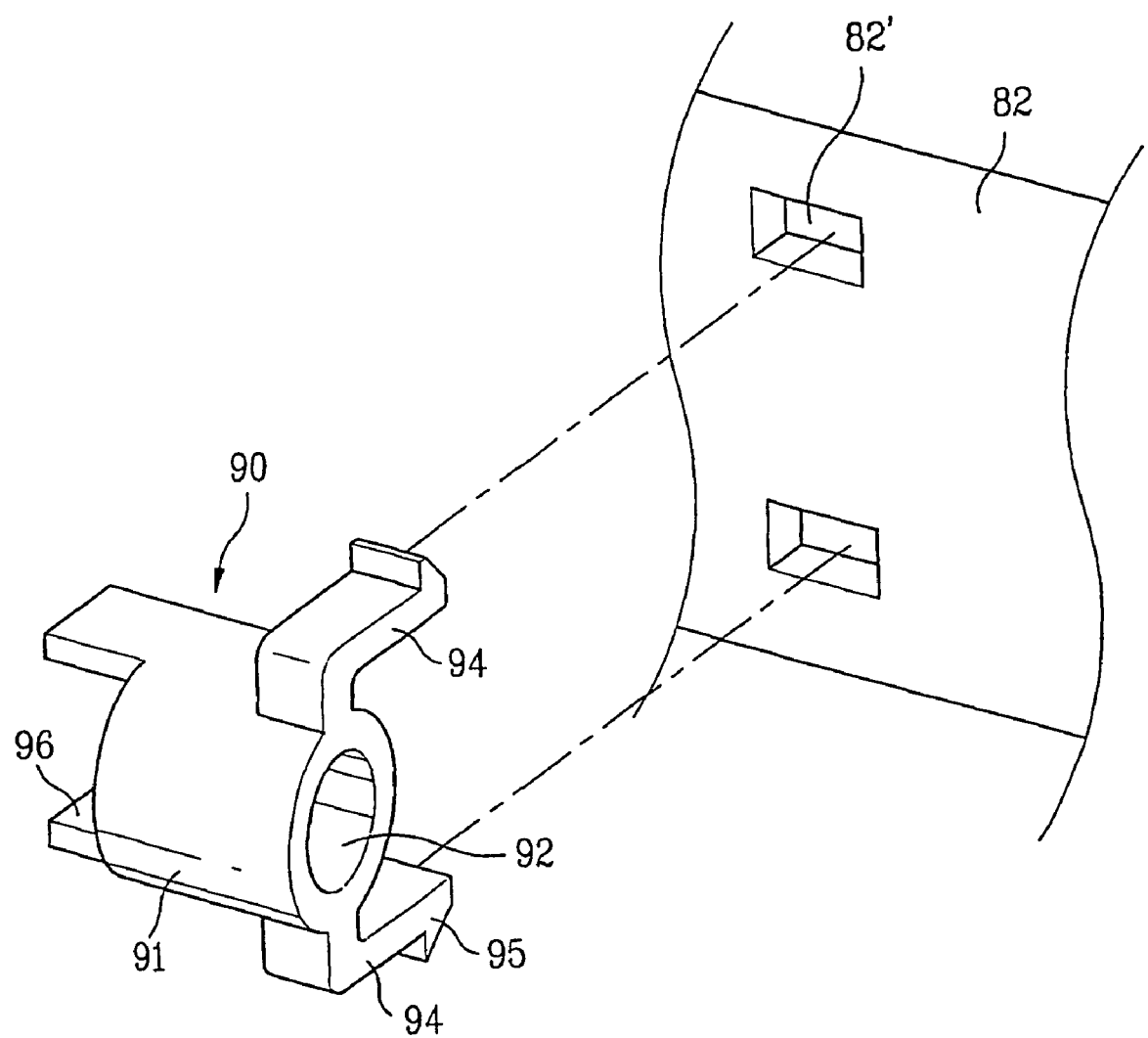
FIG. 11 illustrates a bird's-eye view of a light traveling globe used for a display unit according to an embodiment of the present invention.

A construction of the light guide globe 90 is well shown in FIG. 11.

The light guide globe 90 includes a cylindrical body portion 91 inside which a light guide hole 92 is formed.

The light guide hole 92 collects light emitted from the light source so as to guide the collected light to the light traveling globe 83.

The light source lands at the light guide hole 92.

Loading legs 94 are formed at both ends of the body portion 91.

And, a hook 95 is formed at a lower end of each of the landing legs 94.

The loading legs 94 have structural characteristics enabling to be distorted elastically, whereby the hooks 95 of the loading legs 94 are hooked on a lower face of the substrate 82 through coupling holes 82' formed at the substrate 82, respectively.

Namely, the landing legs 94 of the light guide globe 90 are aligned respectively to the coupling holes 82' formed at the substrate 82 so as to be pushed in. The loading legs 94 having inserted therein through the coupling holes 82' then return to their initial positions so that the hooks 95 at the vertical hems of the loading legs 94 are hooked on the back faze of the substrate 82(cf. FIG. 11). Thus, the light guide globes 90 come into fixation thereto.

And, support pieces 96 are formed at both sides of a rear end of the body portion 91 so as to extend long along an axial direction of the body portion 91 toward the rear side, respectively. The support pieces 96 adhere closely to an upper face of the substrate 82, thereby enabling to support the light guide globe 90 stably.

Meanwhile, the light source 86 landing at the substrate 82, for example, can be LED, and a portion emitting light is installed so as to land inside the light guide hole 92.

Next, a constitution for driving the grill louvers 42 is explained by referring to FIG. 12 to FIG. 14 as follows.

The constitution for driving the grill louvers 42 is loaded on the back face of the front panel 31.

Figure 12:
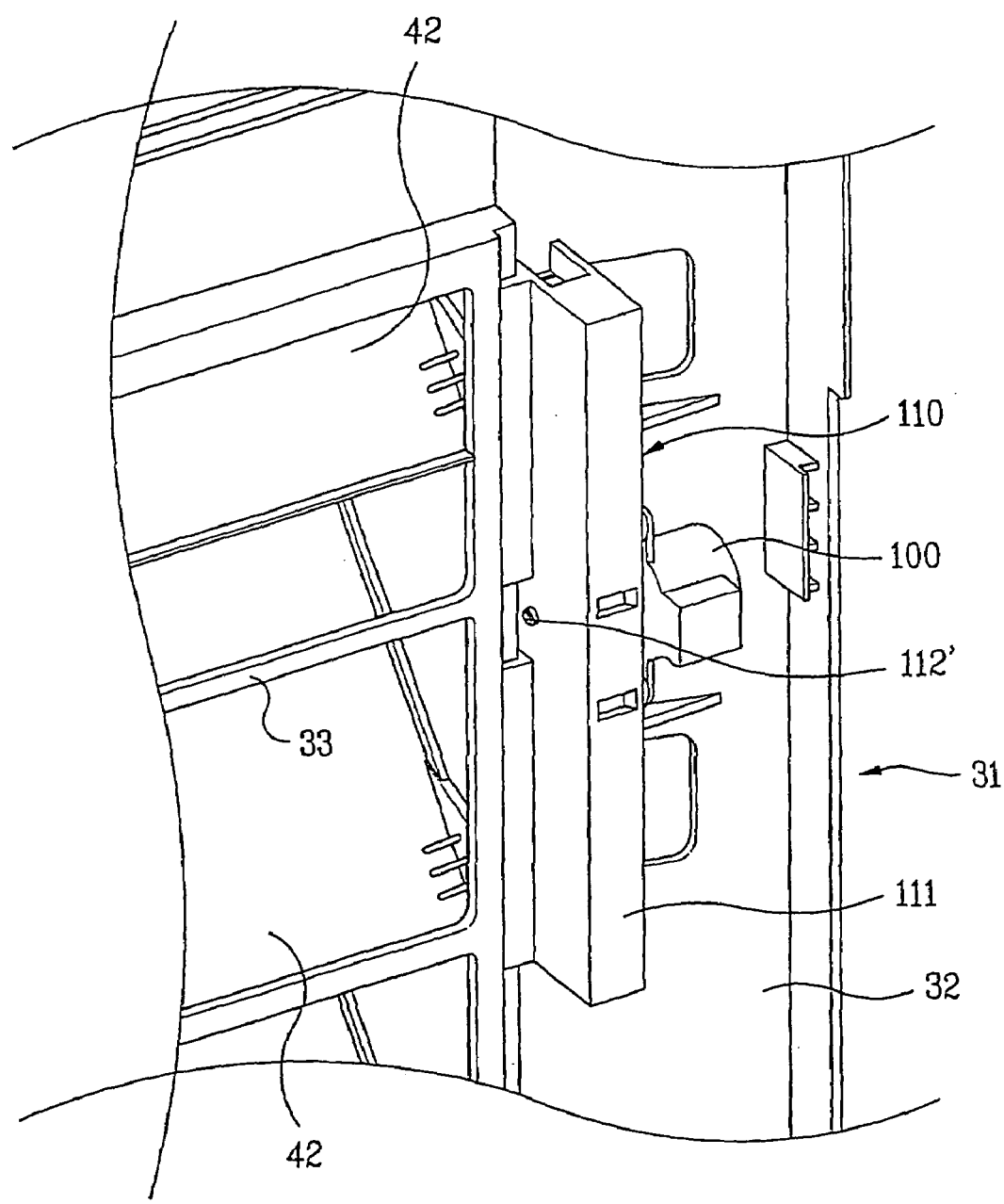
FIG. 12 illustrates a bird's-eye view of a constitution installed at a back face of a front panel according to an embodiment of the present invention.

Referring to FIG. 12, a motor 100 providing a driving force to drive the grill louvers 42 is connected to a driving gear inside a gear housing 111 constituting a power transmission part 110, and the gear housing 111 is installed at right and left rear sides of the front panel 31.

Figure 13:
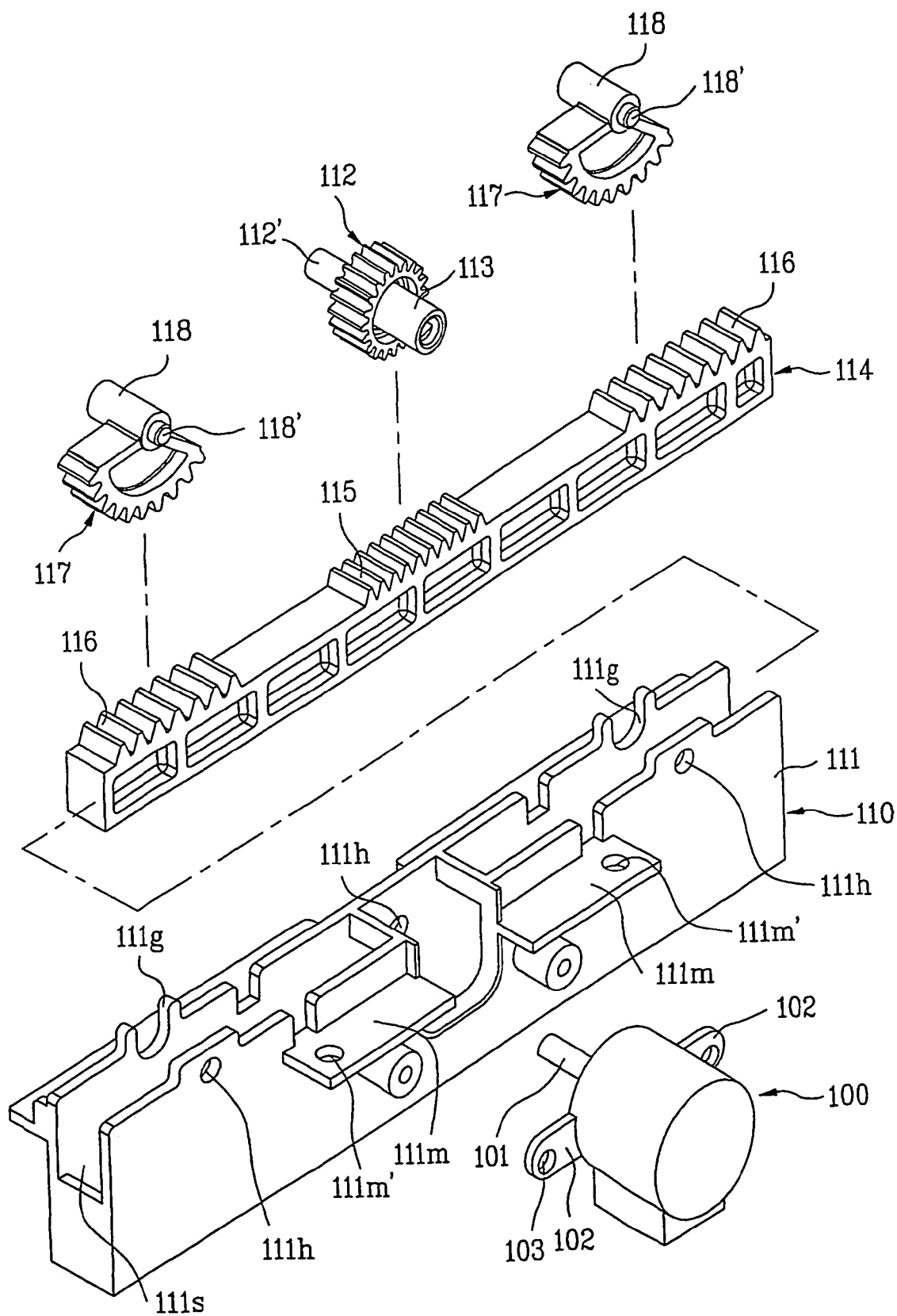
FIG. 13 illustrates a bird's-eye view of a disassembled constitution for driving a blow grill according to an embodiment of the present invention.
Figure 14:
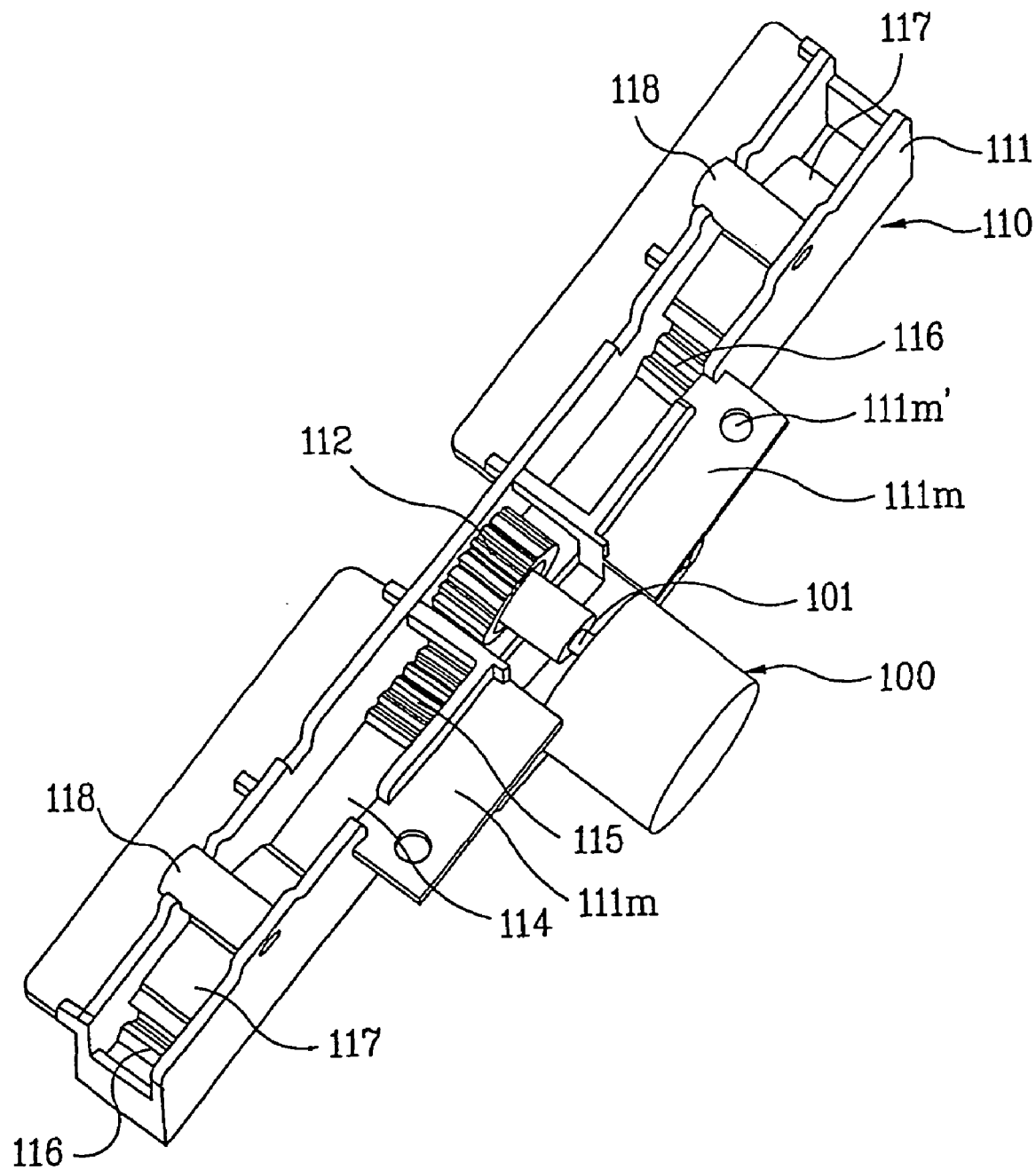
FIG. 14 illustrates a bird's-eye view of a constitution for driving a blow grill according to an embodiment of the present invention.

The motor 100, as shown in FIG. 13, includes a rotating shaft 101 carrying a turning force of the motor 100 so as to protrude through one end of the motor 100 and coupling pieces 102 formed at both sides of one end of the motor 100 so as to be coupled with the gear housing 111.

A coupling hole 103 is formed at each of the coupling holes 102 for screw-locking.

And, the power transmission part 110, when seen from the front face of the front panel 31, is loaded on the back face of the front panel 31 on which the deco panels 34 are installed.

The power transmission part 110 includes a plurality of gears inside the gear housing 111.

A landing space 111s receiving a rack gear bar 114, which will be explained later, is formed open inside the gear housing 111 so as to extend long in one side. And, constitutions at which gears 112 and 117 land to interoperate with the rack gear bar 114 are installed in the opening of the landing space 111s.

Namely, support holes 111h are formed at both right and left sides of one lateral face of the gear housing 111, and guide portions 111g are formed at an upper end of the other lateral face confronting the one lateral face having the support holes 111h so as to be open in one direction.

And, another support hole 111h is formed at the other lateral face of the gear housing 111 confronting a central portion of the other face of the gear housing 111 at which the motor 100 will be loaded.

A driving gear 112 is installed inside the central portion of the gear housing 111.

The driving gear 112 is connected to the rotating shaft 101 of the motor 100 so as to rotate by the motor 100.

A connecting shaft 113 is formed at one end of the driving gear 112 so as to be connected to the rotating shaft 101, and a support protrusion 112' is formed at the other end of the driving gear 112 so as to be inserted for support in the support hole 111h formed at the central portion of the other lateral face of the gear housing 111.

Therefore, the driving gear 112 is installed in a manner that the support protrusion 112' is supported by the support hole 111h and that the connecting shaft 113 is connected to the rotating shaft 101 of the motor 100.

The rack gear bar 114 is installed in the landing space 111s so as to extend long a length direction. A plurality of rack gear portions are formed at the rack gear bar 114, in which a driving rack gear portion 115 gearing into the driving gear 112 is formed in the middle of the rack gear portions.

And, driven rack gear portions 116 are formed at both ends of the rack gear bar 114, respectively.

Driven gears 117 come into gearing into the driven rack gear portions, respectively, and are installed in the gear housing 111 so as to rotate.

Each of the driven gears 117 is a circular arc type gear having gear teeth in part thereof.

And, a connecting shaft 118 extends toward the corresponding hinge hole 38 from each of the driven gears 117.

The hinge shaft 43 of the grill louver 42 is fitted into the corresponding connecting shaft 118. And, the support protrusion 118' formed at one end of the connecting shaft 118 is inserted in the corresponding support hole 111h formed at the right or left side of the one lateral face of the gear housing 111.

Moreover, the other opposite end of the connecting shaft 118 lands at the corresponding guide portion 111g of the gear housing 111.

Besides, brackets 111m for loading are installed at right and left sides of the motor landing position at the one lateral face of the gear housing 111, respectively so as to load the gear housing 111 at the front panel 31. And, a loading hole 111*m*' is formed at each of the brackets 111*m* for loading.

Meanwhile, a pair of the driven gears are driven by the rack gear bar 114 in the embodiment of the present invention. Instead, the present invention enables to drive more grill louvers 42 simultaneously.

In order to drive more grill louvers 42 simultaneously, the number of the driven rack gear portions 116 is determined by the number of the grill louvers so as to be formed on the rack gear bar 114 as well as the number of the driven gears is increased correspondingly.

Figure 15:
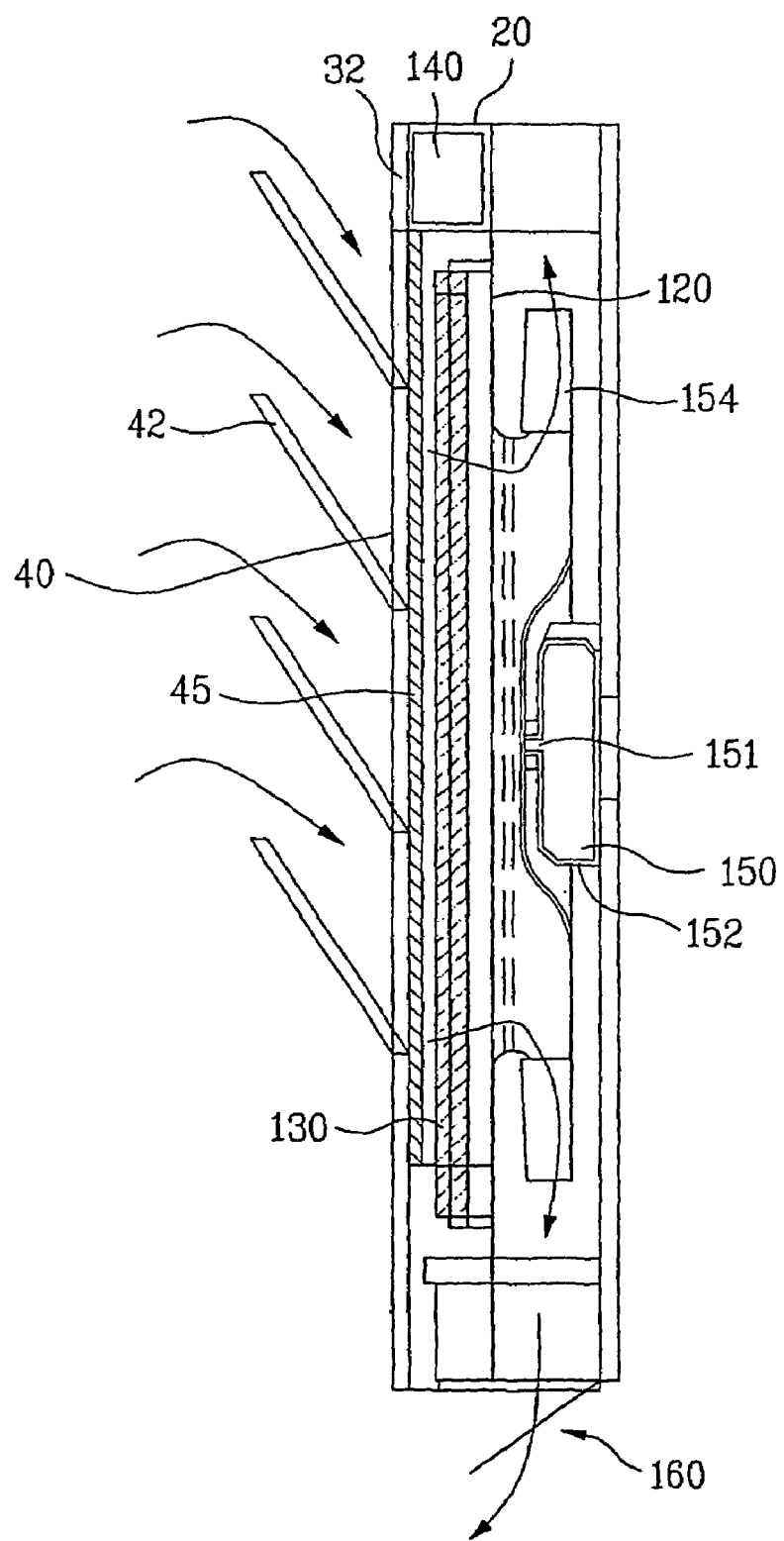
FIG. 15 illustrates a cross-sectional view of an inner constitution of an indoor unit according to an embodiment of the present invention.

Next, an orifice 120, as shown in FIG. 15, is installed in an inner space of the outer case 20.

An orifice hole 122 is formed in the center of the orifice 120 so as to guide the air sucked through the intake part 40 to a turbofan 154 that will be explained in the following description.

Figure 16:
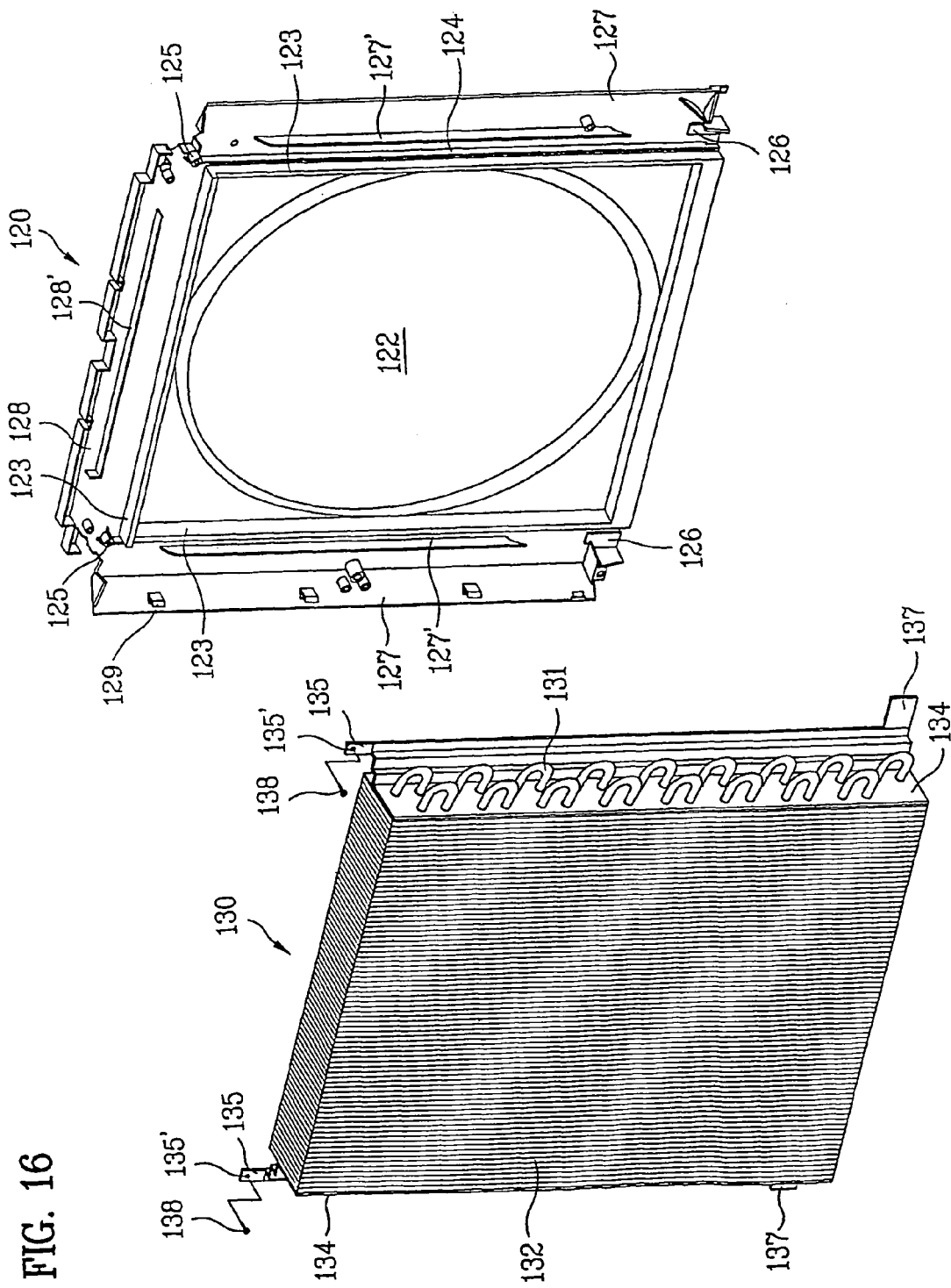
FIG. 16 illustrates a disassembled bird's-eye view of a constitution of a heat exchanger and an orifice according to an embodiment of the present invention.

A constitution of the orifice is explained by referring to FIG. 16 as follows. Referring to FIG. 16, the orifice 120 has a front view of a rectangular plate approximately.

An orifice hole 122 is formed at a center of the orifice 120.

The orifice hole 122 plays a role of a path through which the chilly air generated from heat exchange in a heat exchanger 130 is guided to a turbofan 154 that will be explained in the following.

And, a portion at which the heat exchanger 130 lands is formed at one face of the orifice 120.

Namely, a landing rib 123 is formed to protrude so as to receive a circumference of the heat exchanger 130 inside.

In this case, a shape of the landing rib 123 depends on that of the heat exchanger 130. Thus, the landing rib 123 in the embodiment of the present invention protrudes to form a rectangle around a periphery of the orifice hole 122 so as to correspond to the rectangular heat exchanger 130.

Meanwhile, auxiliary landing ribs 124 are formed outside both lateral sides of the landing rib 123 corresponding to both ends of the heat exchanger 130 in FIG. 16 so as to leave a predetermined interval from the landing rib 123 in parallel.

The auxiliary landing ribs 124 are formed so as not to protrude higher than the landing rib 123.

And, a coupling rib 125 is formed at an upper end of each of the auxiliary landing ribs 124.

A coupling piece 135 formed at a channel 134 of the heat exchanger 130 that will be explained in the following is coupled with the coupling rib 125 by a screw 138.

Besides, supports 126 are formed at both lower side ends of the orifice 120, respectively.

A hanging piece 137 of the heat exchanger 137 is hanged on each of the supports 126 so as to be supported.

Blow guide portions 127 are formed at both lateral sides between which the heat exchanger 130 lands. Back faces of the blow guide portions 127 play a role in guiding the chilly air flowing from the turbofan 154 toward the blow outlet.

Reinforcement ribs 127' extend long on the blow guide portions 127 between upper and lower ends so as to prevent distortion of an orifice body 121.

And, a component landing portion 128 is formed at an upper end of the orifice body 121.

For instance, a control box and the like can land on the component landing portion 128. Another reinforcement rib 128 is formed at the component landing portion 128 to extend long so as to prevent the distortion of the orifice as well.

A numeral '129' indicates a hanger for a fixing power wire.

The heat exchanger 130 is installed between the orifice 120 and filter 45.

A refrigerant of a heat exchange cycle flows through an inside of the heat exchanger 130. And, the air sucked through the intake part 40 passes through the heat exchanger 130 so as to exchange heat with the refrigerant. Therefore, the chilly air at a relatively low temperature is generated from the heat exchanger 130.

The heat exchanger 130, as shown well in FIG. 16, includes a refrigerant pipe 131 bent zigzag multiple-times so as to have the refrigerant of the heat exchange cycle flow inside, a plurality of heat-radiating pins 132 inserted in the refrigerant pipe 131, and channels 134 installed long at both ends of the heat exchanger 130 to support the refrigerant pipe 131 so as to maintain a shape of the heat exchanger 130.

The channels 134 lands at the auxiliary landing ribs 124 and the landing rib 123 in parallel with the auxiliary landing ribs 124 so as to be installed.

For this, the channels 124 are bent multiply, and their lateral end portions pass the auxiliary landing ribs 124 so as to adhere closely to the orifice body 121.

Coupling pieces 135 are formed at upper ends of the channels 124, respectively. The coupling pieces 135 come into being coupled with the coupling ribs 125 by screws 135, respectively. Coupling holes 135' are formed in the coupling pieces 135, respectively.

And, hanging pieces 137 are formed at lower ends of the channels 134, respectively.

Figure 17:
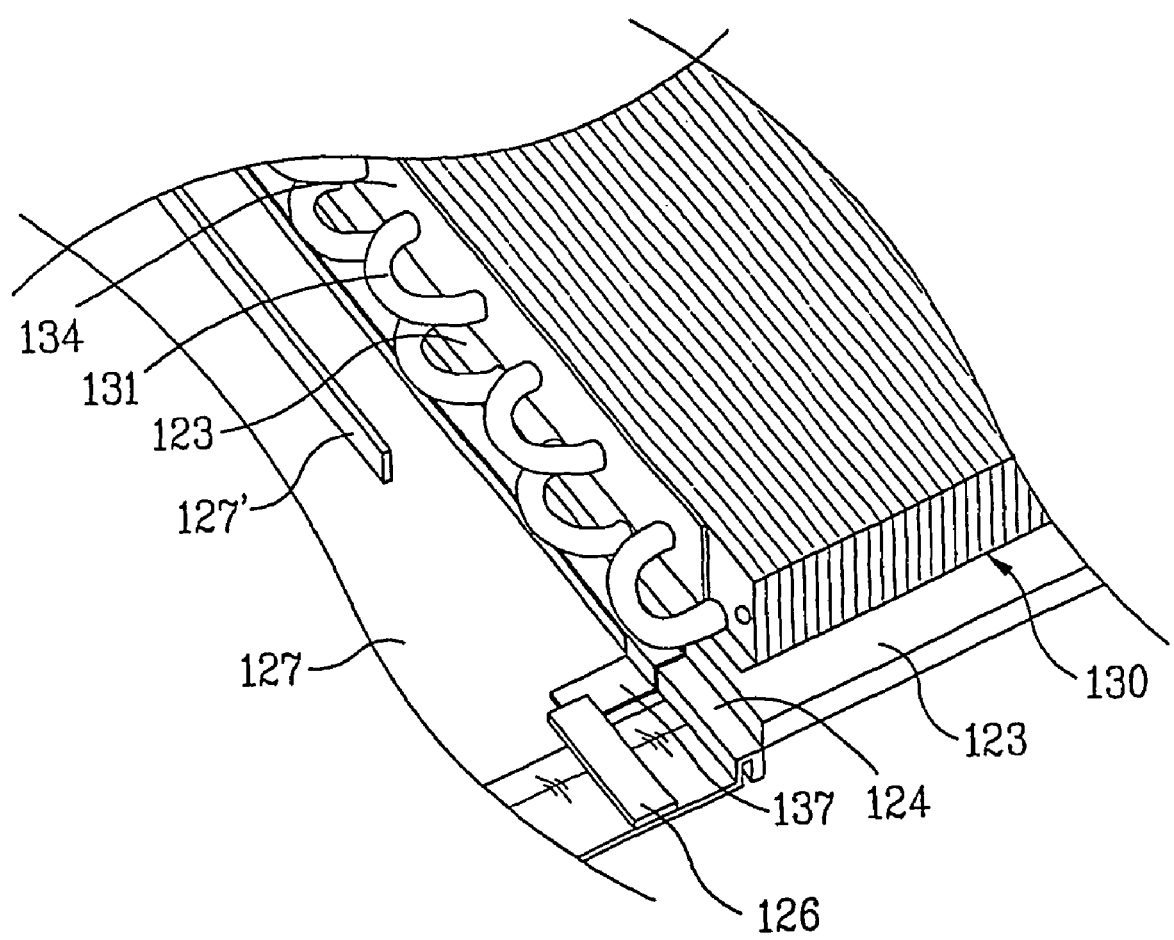
FIG. 17 illustrates a bird's-eye view of a major portion constitution that a heat exchanger is installed at an orifice according to an embodiment of the present invention.

The hanging pieces 137, as shown in FIG. 17, are caught on the rear sides of the supports 126, respectively so as to support the heat exchanger 130.

The heat exchanger 130 has a flat hexahedral shape overall so as to land tat the landing rib 123 of the orifice 120 to be installed thereat.

Yet, the heat exchanger 130 is not limited to the hexahedral shape but can be shaped variously in accordance with a design condition.

Back to the explanation for FIG. 15, a motor 150 is loaded on an inner center of the outer case 20 corresponding to the rear side of the orifice 120.

The motor 150 is fixed to the outer case 20 through a motor bracket 152.

And, a turbofan 154 is installed at a rotating shaft 151 of the motor 150.

The turbofan 154 sucks an air from its vertical hem so as to blow the sucked air in a lateral direction.

Namely, the air is sucked from a front side of the rotating shaft 151 so as to be blown in a centrifugal direction of the turbofan 154.

A control unit 140 is installed at an inner upper side of the outer case 20. The control unit 140 controls operation of the indoor unit. For instance, the control unit 140 compares various sensed data for the operation of the indoor unit to previous setup data so as to control the operation of the motor 150 as well as send a control signal to an outdoor unit for operation.

Figure 18:
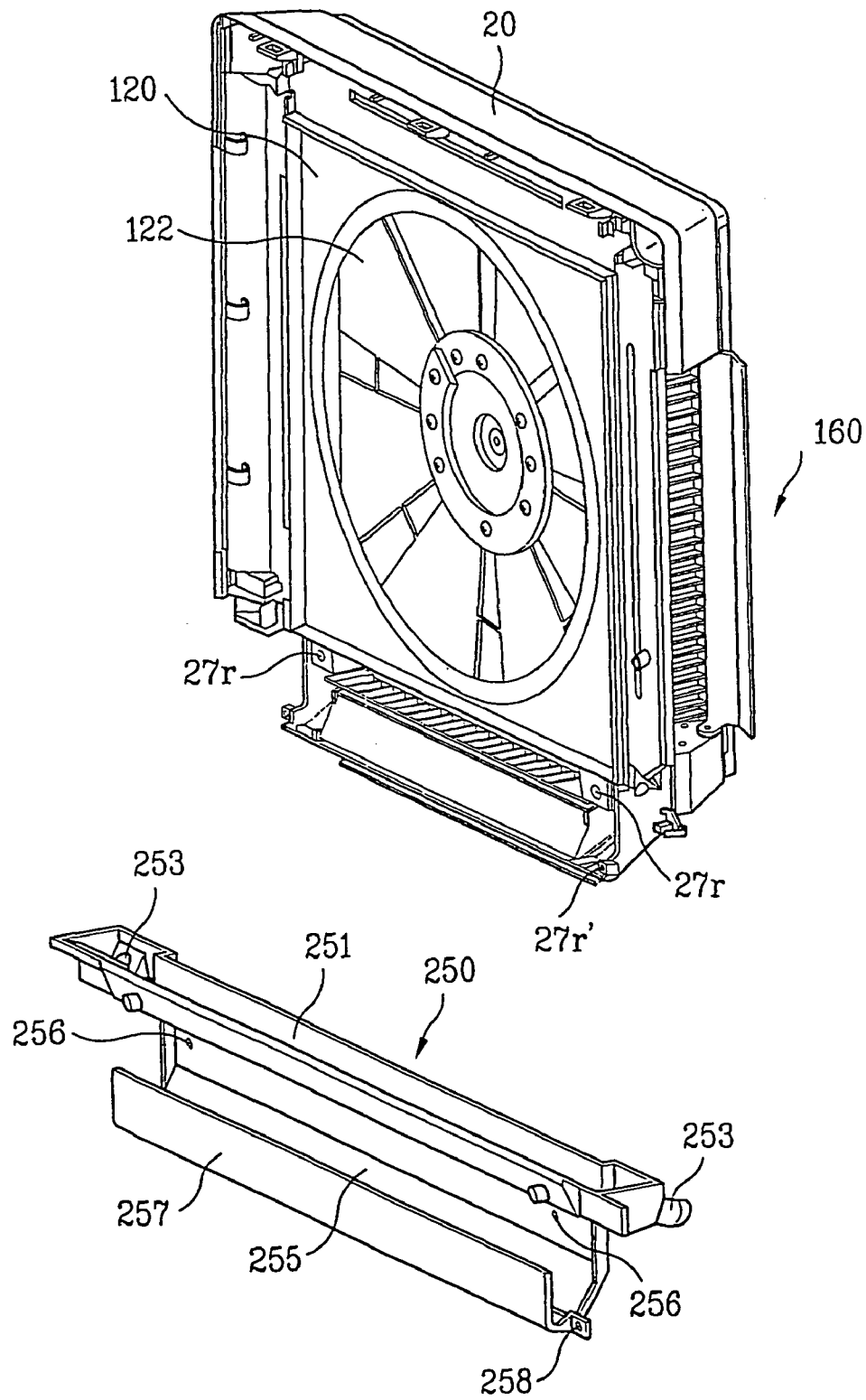
FIG. 18 illustrates a disassembled bird's-eye view for installment of a drain fan according to an embodiment of the present invention.
Figure 19:
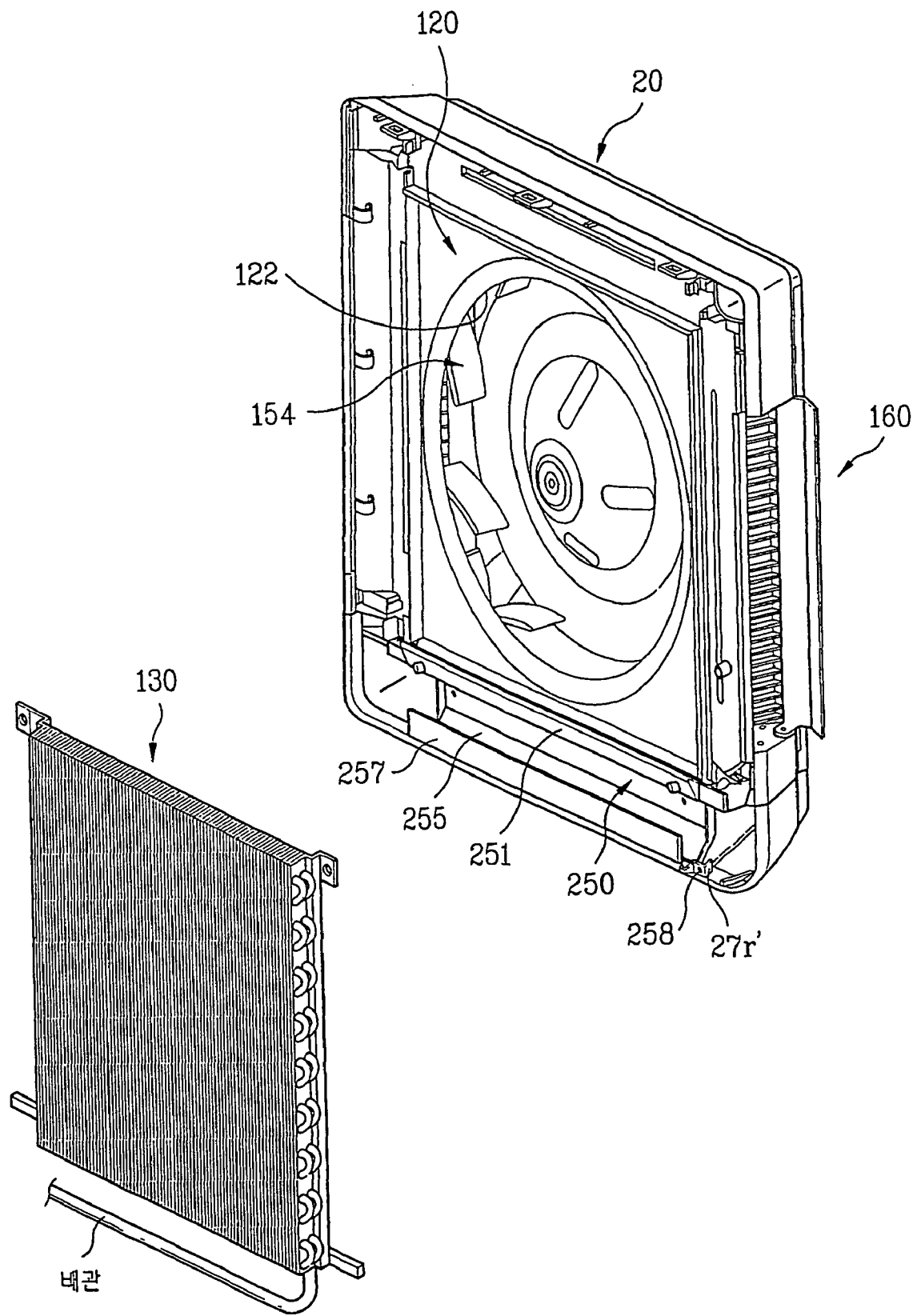
FIG. 19 illustrates a disassembled bird's-eye view for installment of a drain fan according to an embodiment of the present invention.

Next, a drain pan 250 is explained by referring to FIG. 18 and FIG. 19 as follows. The drain pan 250 is installed under a lower side of the heat exchanger 130 so as to collect to drain a condensed water generated from the heat exchanger 130.

In this case, the drain pan 250 is coupled with coupling ribs 27*r* at the lower end of the outer case 20 so as to be placed under the heat exchanger 130.

The drain pan 250 includes a drain pan portion 251 having a narrow front-to-rear width corresponding to a lower end shape of the heat exchanger 130 and a long right-and-left length so as to be placed under the heat exchanger.

The drain pan portion 251 collects the falling condensed water generated from the heat exchanger 130. Hence, the drain pan portion 251 has a front-to-rear width greater than a thickness of the heat exchanger 130 and a length longer than that of a right-to-left length of the heat exchanger 130.

Drain outlets 253 are formed at both ends of the drain pan portion 251, respectively.

Drain hoses (not shown in the drawing) are installed at the drain outlets 253 selectively so as to drain the condensed water gathering in the drain pan portion 251.

The drain outlets 253 are formed at both ends, thereby enabling to select at least one of the drain outlets 253 that will be connected to the corresponding drain hose in order to be suitable for the surroundings where the indoor unit is installed.

Of course, the drain outlet 253 failing to be connected to the drain hose is closed up with an additional means.

Meanwhile, a pipe landing portion 255 is built in one body with the drain pan portion 251.

The pipe landing portion 255 extends to a lower part of the drain pan portion 121, in which pipes of the indoor unit, power wires, and the like are loaded.

Coupling holes 256 are formed at both ends of the pipe landing portion 255 so as to lock the drain pan 250 into the coupling ribs 27r formed at the outer case 20.

Screws (not shown in the drawing) penetrate4 into the coupling holes 256 so as to be coupled with the coupling ribs 27r.

Besides, a pipe cover 257 is additionally installed so as to cover a front side of the pipe landing portion 255. Coupling pieces 258 are formed at both ends of the pipe cover 257 so as to be coupled with coupling ribs 27r' formed at the outer case 20.

Next, a plurality of blow units 160 are installed at the outer case 20. In aspect of a front view of the indoor unit, the blow units 160 are installed long at a right lateral face, a left lateral face, and a bottom face of the outer case 20, respectively.

An internal structure of the outer case 20, at which the blow units 160 are installed, is explained by referring to FIG. 20 as follows.

The outer case 20 includes a rectangular plate type base face 21 and lateral faces 22 extending from edges of the base face 21 approximately in a vertical direction.

A depth of each of the lateral faces 22 is very shorter than a length of each of four sides of the base face 21 relatively, whereby the outer case 20 forms a flat hexahedral shape overall.

Blow unit landing spaces 23 are formed long along two lateral faces 22 and a lower lateral face 22 of the outer case 20.

The blow unit landing spaces 23 receive blow grills 161 that will be explained in the following, respectively.

Various constitutions are provided around the blow unit landing spaces 23.

A plurality of reinforcement bosses 24 are formed at bottoms of the blow unit landing spaces 23.

The reinforcement bosses 24 reinforces a strength of a bottom face of each of the blow unit landing spaces 23 as well as supports a lower face of each blow grill 161.

A first hanging protrusion 25 is formed at an inner upper end of the lateral face 22 adjacent to the blow unit landing space 23.

The first hanging protrusion 25 has a predetermined gap from the lateral face 22 so that a first hanging piece 162 of the blow grill 161 is inserted through the gap to be caught thereon.

And, a second hanging protrusion 25' is formed at a counter position to that of the first hanging protrusion 25.

A second hanging piece 162' of the blow grill 161 is caught on the second hanging protrusion 25'.

Meanwhile, a landing channel 26 is formed long along each inner side where the reinforcement bosses 24 are formed, i.e. a circumference of the base face 21.

A landing rest 163 of the blow grill 161 is mounted on the landing channel 26. Power wires and the like can pass through the landing channel 26.

A hook 27 is formed at one side of the landing channel 26, i.e. toward the first hanging protrusion 25, and a screw coupling boss 28 is formed at the other side (another screw coupling boss at the blow unit landing space 23 is not shown in the drawing as covered by the blow guide 170 due to a drawing direction). Hence the hook 27 and screw coupling boss 28 are coupled with a hook slot 164 at the landing rest 163 of the blow grill 163 and a coupling hole 164', respectively.

Namely, one side of the blow grill 161 is fixed thereto in a manner that the hook slot 164 at one, side of the landing rest 163 is caught on the hook 27. And, the other side of the blow grill 161 is fixed thereto in a manner that a screw penetrating into the coupling hole 164' at the other side end is coupled with the screw coupling boss 28.

The peripheral constitution of the blow unit landing space 23 is equally applied to the blow unit landing spaces 23 formed at the right, left, and lower sides, respectively.

Therefore, the blow grills 161 identical to each other can land at the respective blow unit landing spaces 23, thereby enabling to be produced as one type.

A constitution of the blow unit 160 is explained as follows.

The blow grill 161 forms a frame of the blow unit 160.

A blow outlet 161' is formed inside the blow grill 161 so as to be a path through which the heat-exchanged air inside the indoor unit is blown into the space for air-conditioning.

A constitution for the fixation to each of the blow unit landing space 23 is installed at the blow grill 161.

First of all, the first hanging piece 162 is formed to protrude at a position corresponding to the first hanging protrusion 25, and the second hanging piece 162 is formed to protrude at a position corresponding to the second hanging protrusion 25'.

And, the landing rest 163 is formed at a lower end of the blow grill 161 so as to extend long in a length direction of the blow grill 161.

The landing rest 163 lands at the landing channel 26.

In this case, the landing rest 163 has an opening downward so as to provide a space part when landing at the landing channel. Hence, power wires and the like enable to pass through the space part.

As mentioned in the forgoing description, the hook slot 164 on which the hook 27 is caught is formed at one end of the landing rest 163, and the coupling hole 164', into which the screw (not shown in the drawing) penetrates to be locked into the screw coupling boss 28, is formed at the other end of the landing rest 163.

A blow louver 166 is installed at a vertical hem of the blow outlet 161' of the blow grill 161.

The blow louver 166 closes/opens the blow outlet 161' selectively, and is driven by an additional driving source.

Figure 21:
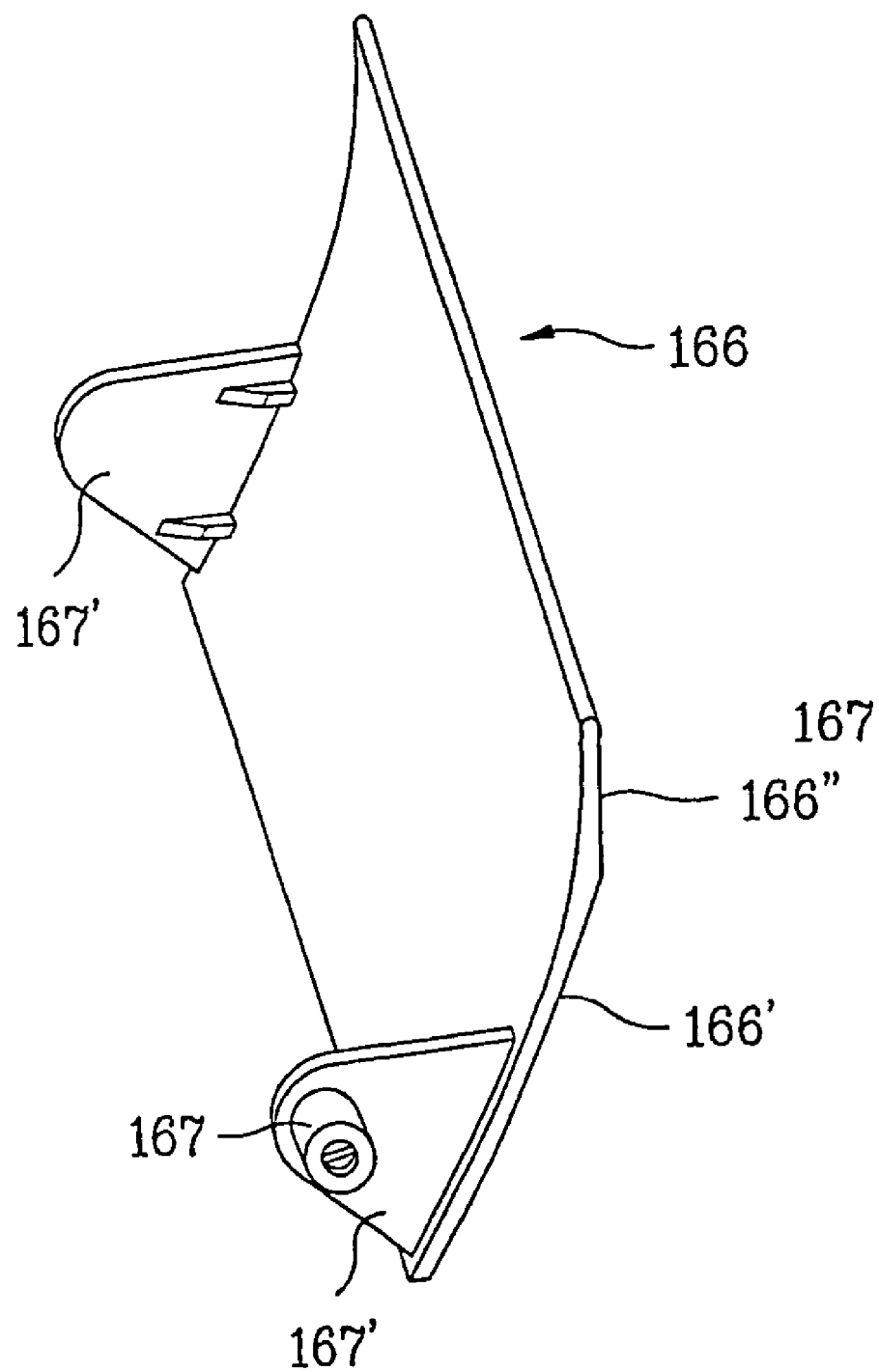
FIG. 21 illustrates a bird's-eye view of a blow louver constructing an embodiment of the present invention.

In the blow louver, as shown in FIG. 21, an inner face of a plate type louver body 166' corresponding to the blow outlet 161' guides an air blown through the blow outlet 161'.

The inner face has a predetermined curvature from an upper stream to a lower stream by taking an air blow direction as a reference so as to guide the air.

The inner face of the louver body 166' is formed to has the predetermined curvature, but a predetermined area at a vertical hem side of an outer face is formed to have a plane (hereinafter this plane is called a vertical hem plane portion 166").

Therefore, a portion, where the vertical hem plane portion 166" and the outer face become adjacent to each other, is formed relatively thicker.

The vertical hem plane portion 166" plays a role in reinforcing a strength of the louver body 166'.

Namely, even if a blow vane 169, which will be explained later) is not built in one body under the louver body 166', the existence of the vertical hem plane portion 166" enables to maintain a predetermined strength.

Hinge plates 167' are formed at both ends of the louver body 166' so as to protrude, and a hinge shaft 167 is formed at each of the hinge plates 167'.

One of the hinge shafts 147 is connected to a motor for driving the blow louver 166.

Figure 22:
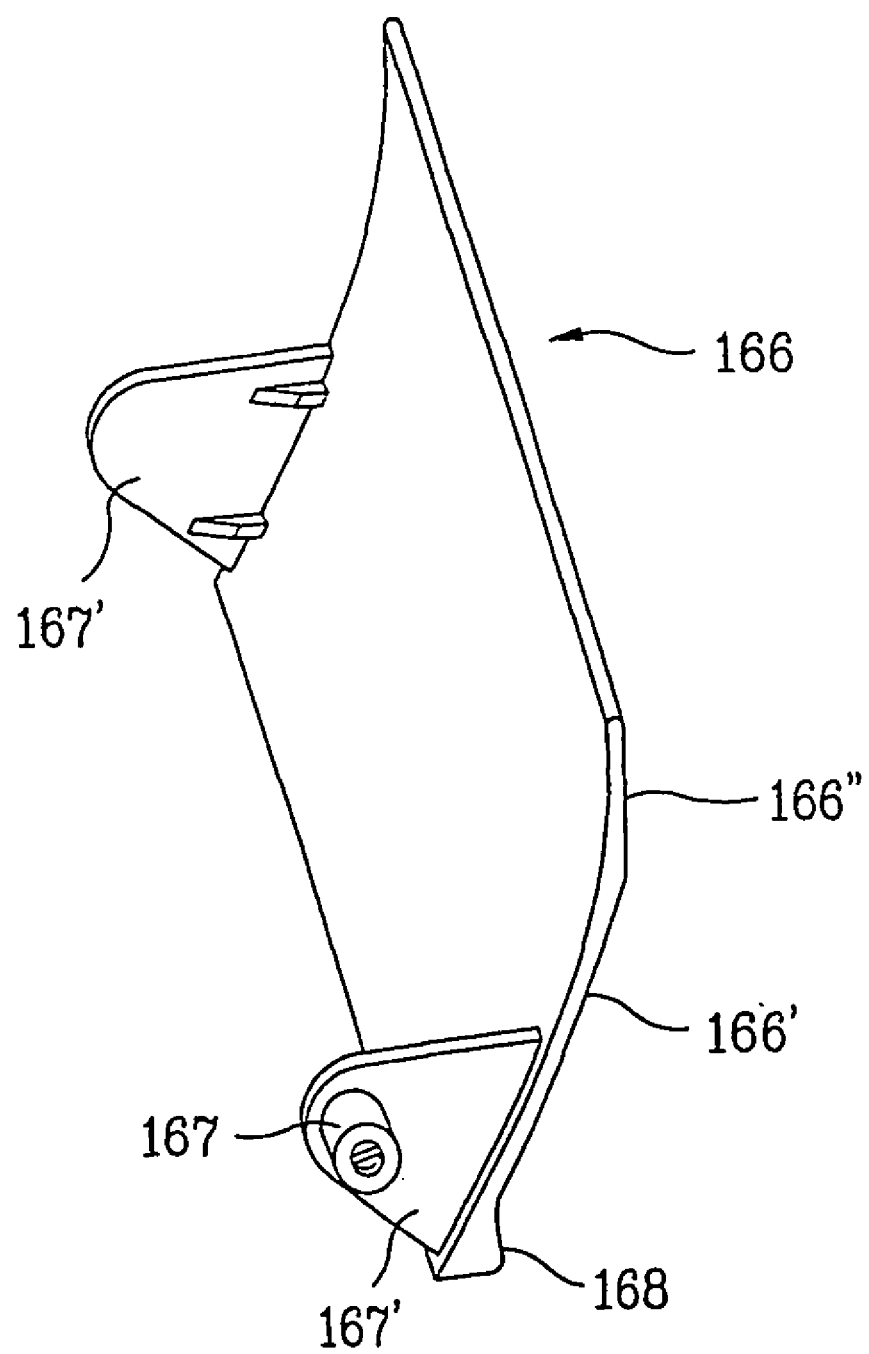
FIG. 22 illustrates a bird's-eye view of a modified blow louver constituting an embodiment of the present invention.

Next, another embodiment of the present invention for the blow louver 166 is shown in FIG. 22, in which a shut-off portion 168 is formed at an outer upper stream portion of the louver body 166'.

The shut-off portion 168 shuts off a space between the outer face and one sidewall of the blow outlet 161' confronting each other when the blow louver 166 revolves to move so as to open the blow outlet 161'.

Hence, the air having passed the blow outlet 161' is prevented from leaking through this space.

Meanwhile, a plurality of blow vanes 169 are formed at the blow outlet 161' of the blow grill 161.

The blow vanes 169 are installed at the entire blow outlet 161' so as to leave a predetermined interval from each other. Thus, the blow vanes 169 let the air blown uniformly through the entire blow outlet 161'.

Moreover, the blow vanes 169 are formed to incline to with a predetermined angle in a direction of one end so that the air is blown with a constant direction.

Referring back to FIG. 20, a constitution for guiding the air blown from the turbofan 154 is installed at the outer case 20.

First of all, blow guides are built in one body with the outer case 20.

The blow guides 170 are formed at both sides of a lower end of the base face 21 to protrude from the base face 21, respectively so as to guide the air to the blow units 160 installed at two lateral sides and the lower side of the outer case 20.

Lead wire channels 171 are formed concavely at upper faces of the blow guides 170, respectively. Hence, lead wires, which apply a power and control signals to the components constituting the air conditioners, pass through the lead wire channels.

Figure 20:
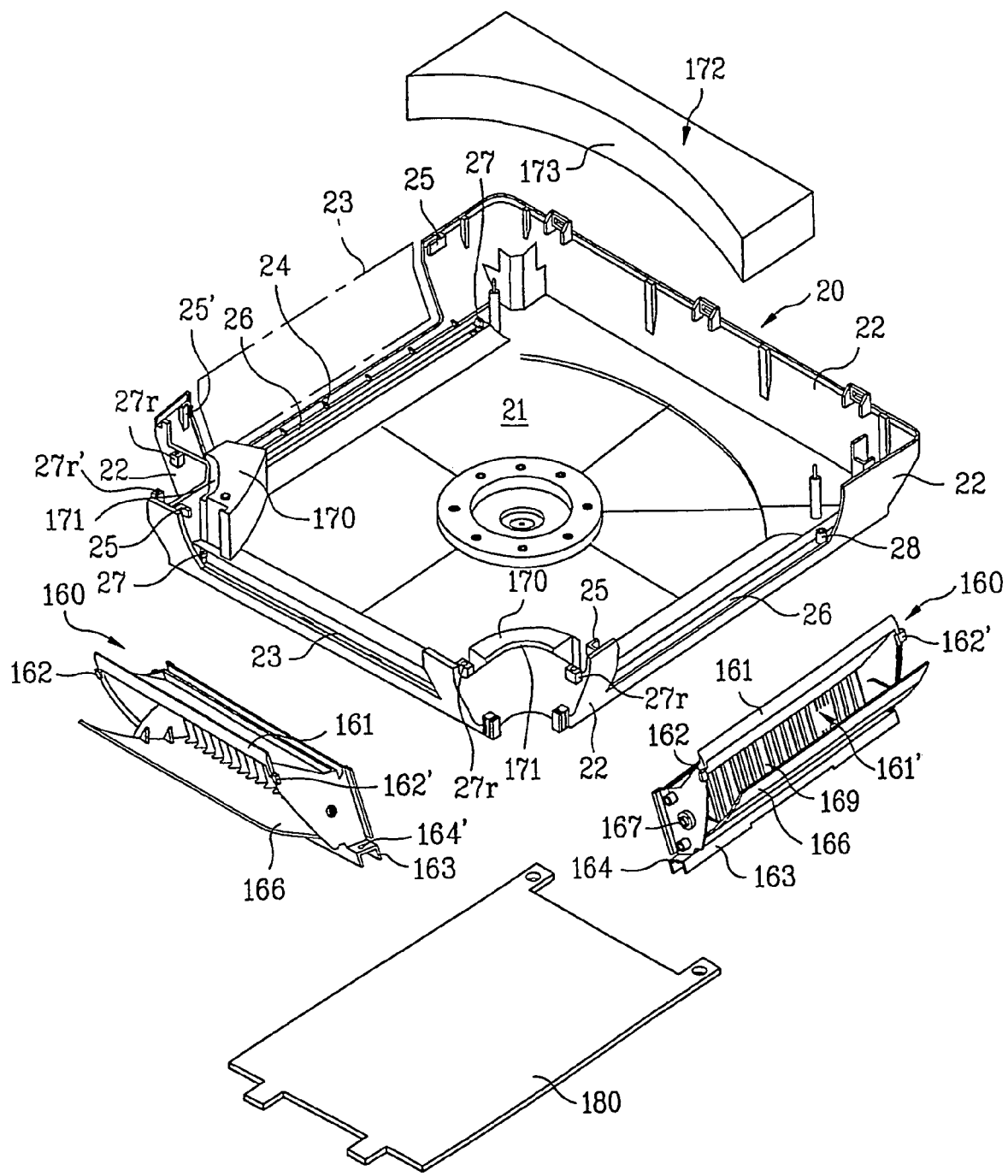
FIG. 20 illustrates a disassembled bird's-eye view of a constitution of an outer case and a blow unit according to an embodiment of the present invention.
Figure 23:
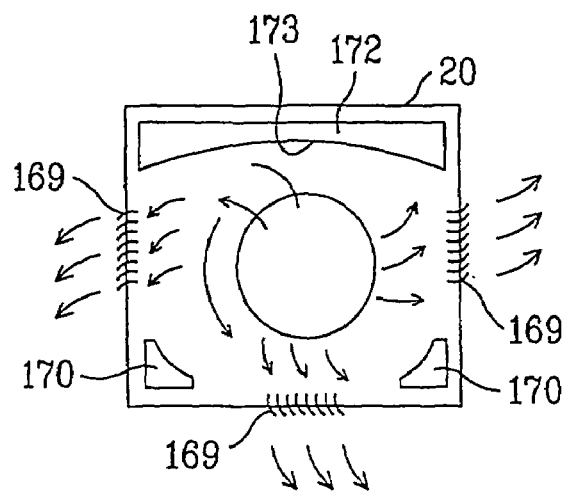
FIG. 23 illustrates an operating status diagram for explaining blow directions of an air in an embodiment of the present invention.

And, a separable blow guide 172, as shown in FIG. 20 and FIG. 23, is installed over the base face 21 of the outer case 20.

The separable blow guide 172 is installed over an inward upper end of the outer case 20 overall so as to guide the air blown from the turbofan 154 to the blow units 160 at both lateral sides of the outer case 20.

The separable blow guide can be made of Styrofoam, and one face of the separable guide forms a guide face 173 having a curvature corresponding to that of the turbofan 154.

A reinforcement plate 180 is loaded on a back face of the base face 21 of the outer case 20. The reinforcement plate 180 is preferably made of a metal material so as to be loaded on the base face 21 by screws or fixing members.

The reinforcement plate 180 is loaded on the back face of the outer case 21 from upper to lower ends so as to pass through the portion at which the motor 150 lands. Thus, the reinforcement plate enables to reinforce a strength of the outer case 20.

Figure 24:
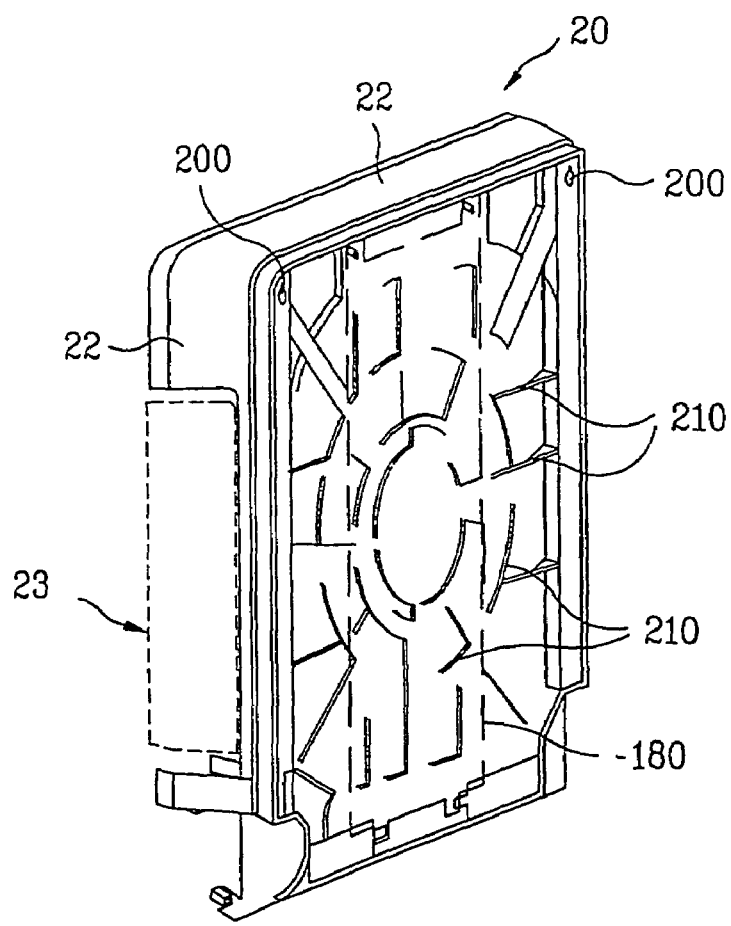
FIG. 24 illustrates a bird's-eye view of a back face of an outer case constituting an embodiment of the present invention.

Meanwhile, hanging holes 200, as shown in FIG. 24, are formed at both upper ends of the back dace of the outer case 20, respectively.

Hanging protrusions (not shown in the drawing) are inserted into the hanging holes 200, respectively so that the indoor unit is supported to hang on a wall of a room.

And, reinforcement ribs 210 are formed at the back face of the base face 21 so as to reinforce the strength hereof.

Operation of the above-constituted embodiment according to the present invention is explained in detail as follows.

First of all, explained is the operation that the indoor unit operates at a cooling mode.

When the air conditioner operates no more, the grill louvers 42 close the intake part 40, and the blow louvers 166 of the blow units 160 close the blow outlets 161' as well, respectively.

Namely, the vertical hems of the grill louvers 42 adhere closely to the front panel body 32, and the blow louvers 166 are received toward the corresponding blow grills 161.

Therefore, external particles such as dust and the like fail to flow inside the indoor unit and the outer case 20 becomes a flat hexahedral exterior overall, whereby the indoor protrudes less from the wall surface on which the indoor unit is hung.

Once the air conditioner is actuated, the turbofan 154 starts revolving, and the grill louvers 42 and blow louvers 166 are driven so as to open the intake part 40 and blow outlets 161', respectively.

The air in the air-conditioned space, as indicated by arrows in FIG. 15, flows inside the indoor unit through the intake part 40 at the front face of the indoor unit.

Particles such as dust on the air having passed the intake part 40 are filtered by the filter part 46f of the filter 45, and the filter part 46f adsorbs smell.

The air having passed through the filter 45 flows toward the heat exchanger 130.

In the heat exchanger 130, heat exchange occurs between the air and a working fluid of the heat exchange cycle.

In this case that the indoor unit operates at the cooling mode, heat is transferred to the working fluid from the air. Hence, a temperature of the air is decreased relatively.

The heat-exchanged air through the heat exchanger 130 passes through the orifice hole 142 of the orifice 120 so as to be transferred to the turbofan 154.

The air enters inside the turbofan 154 in a direction of a revolution center of the turbofan 154, and then guided by blades of the turbofan 154 so as to be blown in a circumference direction.

The air blown in the circumference direction is directly transferred to the blow units 160, or guided by the blow guides 170 and 172 so as to be transferred to the blow units 160.

There are other parts guiding the air blown from the turbofan 154 such as the blow guide portions 127 of the orifice 120 and the base face 21 of the outer case 20.

Therefore, the air is guided by the blow guides 170 and 172, blow guide portions 127, and base face 21.

In the blow units 160, the air is blown through the blow outlets 161' formed in the blow grills 161.

In this case, the air is guided by the blow vanes 169 installed at the blow outlets 161', and then guided again by the blow louvers 166 so as to be blown.

The blow vane 169 is built in one body with the corresponding blow grill 161, and the blow louver 166 is driven by the driving source only. Hence, the load of the driving source becomes lessened, thereby operating smoothly.

Namely, unlike the related art, the blow vanes 169 fail to be formed at the movable blow grill 161, whereby a driving load is reduced.

Meanwhile, the air blown from the blow outlets 161' is guided by the blow louvers 166 toward front and lateral sides of the indoor unit.

In this case, the inner face of each of the blow louvers 166 has a predetermined curvature from its upper to lower streams, thereby enabling to guide a flow of the air more effectively.

Moreover, in aspect of the blow louver 166 according to another embodiment of the present invention, the shut-off portion 168 blocks the space between the blow grill 161 and an upper stream portion of the blow louver 166, when the blow louver 166 is open, thereby enabling to prevent leakage through the space.

Namely, a blow path of the air is unified by the shut-off portion 168, whereby the entire air, which is passing the blow outlet 161', is guided by the inner face 95 of the blow louver 166 so as to blown.

And, the air is distributed uniformly all over the blow outlet 161' so as to be blown.

Meanwhile, the air is blown with a predetermined direction for the formation angle of the blow vanes 169.

The reason why the air has the direction is explained by referring to FIG. 23 as follows.

For this explanation, the respective blow vanes 169 incline to the second hanging protrusion 25'.

In this case, the respective vanes 169 are positioned as shown in FIG. 23 so that the air blown through the blow outlets 161' comes generally into facing counterclockwise in aspect of a front view of the indoor unit.

Of course, the air is blown clockwise if the formation direction of the blow vanes 169 is opposite to the former.

Even though the blow unit 160 fails to be formed at an upper side of the outer case 169, the air is blown through the right, left, and lower sides with directions. Then, the air sucked through the intake air vent part 33 at the front face of the indoor unit fails to be mixed with the blown air so that the blown air is surely delivered to the air-conditioned space. Therefore, it is able to cool the entire space quickly down to a uniform temperature.

Moreover, the blow unit 160 fails to be installed at the upper side of the outer case 20, which is because the chilly air blown upward naturally sinks down by convection so as to be sucked inside the indoor unit instantly through the intake part 40.

Therefore, the indoor unit according to the present invention sucks only the air of relatively high temperature through the intake part 40 in the air-conditioned space, thereby enabling to increase a heat-exchange efficiency.

Next, operation of each of the grill louvers 42 is explained in detail by referring to FIGS. 12 to 15 as follows.

The grill louver 42 is installed so that the vertical hem of the grill louver 42 adheres closely to the front panel 31. Hence, the grill louver 42 closes the intake air vent part 33 normally. Yet, the grill louver 42 is driven to open the intake air vent part 33 by the driving force of the motor 100 only when the air conditioner is actuated.

For this operation, the motor 100 revolves so that a revolving force of the motor 100 is transferred to the driving gear 112. The driving force transferred to the driving gear 112 is transferred to the rack gear bar by the rack gear bar 114 and driving rack gear portion 115 gearing into each other.

Therefore, the rack gear bar 114 moves straight in the landing space 111$s$ of the gear housing 111.

The straight movement of the rack gear bar 114 revolves the driven gears 117 gearing respectively into the driven rack gear portions. The revolutions of the driven gears 117 revolve the grill louvers 42, which are connected to the connecting shafts 118 through the hinge shafts 43, centering around the hinge shafts 43, respectively.

And, if the motor 100 revolves reversely, the moving direction of the rack gear bar 114 is reversed so as to make the grill louver 42 revolve in a reverse direction.

All of the grill louvers 42 are operated by the above system so as to open/close the intake air vent part 33.

Meanwhile, each of the driven gears 117 is formed to be a circular arc type so that gear teeth are just formed on a necessary portion of each of the driven gears 117. Correspondingly, a diameter of the driving gear 112 is reduced.

Therefore, a space required for installing the driving gear 112 and the driven gears 117 is reduced half, thereby enabling to make the indoor unit slim.

Next, a process of attaching/detaching the filter 45 is explained.

The filter 45 is installed at the front side of the intake air vent part 33 of the front panel 31. And, the filter 45 is installed as detachable while the grill louvers 42 are installed.

Namely, each of the grill louvers 42 is installed to leave apart from the air vent frame 33', whereby a gap exists between the air vent frame 33' and each of the grill louvers 42.

Hence, the filter 45 is attached/detached through the gap between the air vent frame 33' and the lowest one of the grill louvers 42.

Specifically, the base panel 50 is made to descend to a lower side of the front panel 31 so that an upper end of the base panel 50 is hung on a lower end of the front panel 31. The filter 45 is then pushed in or pulled out through a gap between the panel body 32 and the lowest grill louver 42.

If the filter 45 is to be loaded, for instance, a user firstly aligns an upper end of the filter 45 to the gap between the panel body 32 and the lowest grill louver 42, makes the aligned upper end slide in the gap, and then pushed the reset portion of the filter 45 toward top.

In this case, both ends of the intake filter frame 46 are guided by the filter landing ends 35, respectively so as to move upward.

Once the filter has completely moved upward, the hanging protrusions 46' of the upper end are inserted into the hanging slots 36, respectively.

And, the lower end of the intake filter frame 46' is caught on the rear sides of the hanging protrusions 36' formed at the lower end of the intake air vent part 33.

This operation is possible since the gap exists between the grill louvers 42 and the air vent frame 33' and the intake filter frame 46 is somewhat flexible.

After the filter 45 has been loaded on the intake air vent part 33, the base panel 50 is made to ascend so as to be loaded as shown in FIG. 4.

If the loaded filter 45 is to be detached, the base panel 50 is moved under the lower part of the front panel 31. The handle 49 of the filter 45 protruding out of the lowest grill louver 42 is then pulled.

Next, elevating operation of the base panel 50 is explained as follows.

First of all, the guide pins 54 of the base panel 50 are guide along the guide slots 34g, respectively.

And, the guides 34' protruding from both sides of the deco panels 34 are inserted in the guide grooves 55' formed between the guides 55 at both sides, respectively so as to guide the elevation of the base panel 50.

When the base panel 50 is elevated, the base panel ascends 50 to reach a predetermined position of the front panel 31 so as to be caught on the hanging protrusions 34t. If an ascending force is applied continuously to the base panel 50, inner sides of the guide pins 54 go over the hanging protrusions 34t, respectively.

Once the guide pins 54 go over the hanging protrusions 34t completely, lower ends of the guide pins 54 are instantly caught on the hanging protrusions 34t so as to prevent the base panel 50 from falling by gravity.

Moreover, when the bas panel 50 is moved downward completely, the reinforcement rib 52 of the base panel 50 is caught on the support rod 62 installed at the front panel 31 so as to be supported. Thus, the base panel 50 is prevented from being separated from the front panel 31 randomly.

Next, the display unit 80 is explained in the following.

Figure 10:
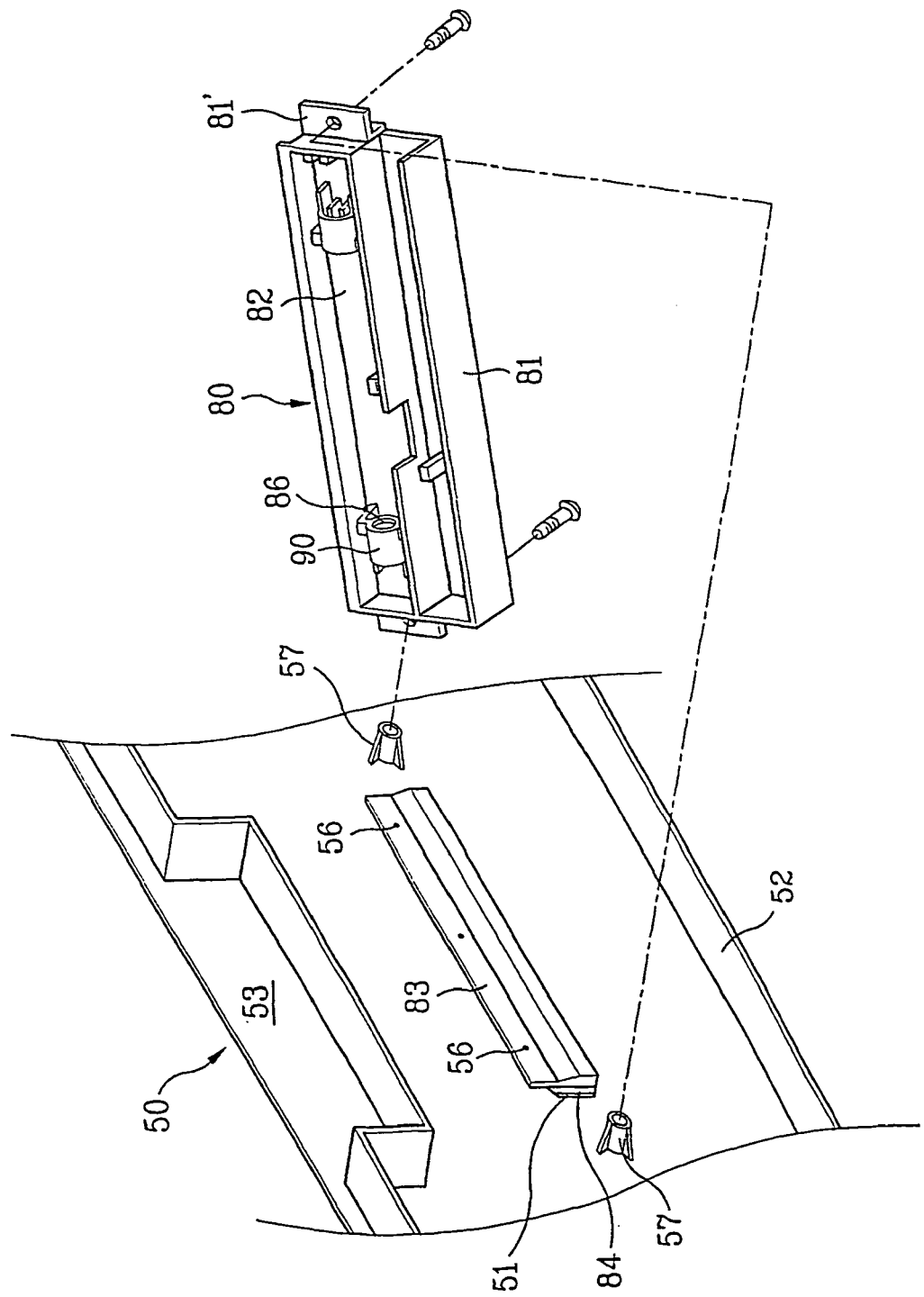
FIG. 10 illustrates a disassembled bird's-eye view of a display unit according to an embodiment of the present invention.

The display unit 80 is a part excluding the light traveling globe 83 and light emitting part 84, and is prepared as one assembly shown in FIG. 10.

The display unit 80 is loaded on the back face of the base panel 50.

In this case, the light traveling globe 83 is loaded in a manner that the welding portions 56 are welded at the base panel 50.

Since the display unit 84 previously lands at the display window 51 of the base panel 50, the landing light emitting part 84 is naturally fixed to the display window 51 of the base panel 50 as the light traveling globe 83 is loaded on the base panel 50.

Under such circumstances, once the housing 81 is loaded on the base panel 50, the light guide globes 90 are positioned at both ends of the light traveling globe 83 so as to transfer the light from the light source 86 to the light traveling globe 83.

Meanwhile, the light guide globes 90 are loaded on the coupling holes 82' perforating into the substrate 82. Namely, when the loading legs 94 are aligned to the coupling holes 82', the hooks 95 come into contact with outer ends of the coupling holes 82', respectively.

Under such circumstances, a pushing force is applied to the light guide globe 90, the hooks 95 are guided along the outer ends of the coupling holes 82' so as to be elastically distorted in directions getting closer to each other.

Once the hooks 95 are completely inserted inside the coupling holes 82', each of the landing legs 94 returns to its original position so that each of the hooks is caught on the back face of the substrate 82.

In this case, the support pins 96 are supported on the substrate 82 so as to support the light guide globes 90 stably.

Thus, the light guide globes 90 are loaded completely.

Besides, in order to separate each of the light guide globes 90 from the substrate 82, incline planes of the hooks 95 are grabbed, a force is applied to the incline planes of the hooks 95 in closing directions between the loading legs 94 so as to release the hooks 95 from being caught on the back face of the substrate 82, and then the hooks 95 are pushed in an upper direction of the substrate 82 so as to get out of the coupling holes 82', respectively.

In this case, each of the light guide globes 90 enables to transfer the light emitted from the light source to the light traveling globe 83 more effectively through the light guide hole 92.

Namely, the light guide hole 92 of the light guide globe 90 comes into adhering closely to a side of the light traveling globe 83, whereby the light emitted from the light source 86 is completely transferred to the light traveling globe 83 instead of radiating peripherally.

Therefore, more light can be transferred to the light emitting part 84 even if the light source of the same power is used.

In the above-constituted display unit 80, the light emitted from the light source 86 is completely transferred to the light traveling globe 83 through the light guide hole 92 of the light guide globe 90.

And, the light is transferred to the light emitting part 84 through the light traveling globe 83 made of an optical material so as to be emitted in the front side of the base panel 50 through the display window 51.

Meanwhile, it is able to set up various colors, which are provided by the light source 86 so as to be displayed on the display window 51 by the light emitting part 84.

Namely, when red, green, and blue diodes are used as light sources, red, green, and blue colors as the three primary colors of light can be displayed with the consequence where voltages are applied, respectively. Therefore, the color provided by the light source 86 is controlled so as to display one of various colors.

For instance, red, green, and blue colors can represent reservation, cooling, and blowing, respectively. And, a strength of a color emitted from the light source 86 is controlled so as to realize another color for dehumidification.

Next, explained in the following by referring to FIG. 16 is a process of coupling the heat exchanger 130 with the orifice body 91 of the orifice 120.

Once the coupling pieces 137 at the lower ends of the channels 134 installed at both side ends of the heat exchanger 130 are made to be caught on the supports, respectively, and the heat exchanger 130 is made to land inside the landing rib 123.

In this case, a part constituted with the refrigerant pipe 131 and heat-radiating pins 132 is received inside the landing rib 123, while the channels 14 land at the landing rib 123 and auxiliary landing ribs 124.

The coupling holes 135' of the coupling pieces 135 at the upper ends of the channels 134 are made to correspond to the coupling ribs 125, and then the screws 138 are made to penetrate to be coupled with the coupling ribs 125, respectively so as to fix the heat exchanger 130 to the orifice body 121.

Once the heat exchanger 130 lands at the space provides inside the landing rib 123, the periphery of the heat exchanger 130 is shielded by the landing rib 123.

Therefore, the heat-exchanged air having passed through the heat exchanger 130 flows toward the turbofan 154 through the orifice hole 122 of the orifice 120 but fails to leak outside the landing rib 123.

Accordingly, a flow of air is performed inside the indoor unit as designed.

Next, the drain pan 250 is explained by referring to FIG. 18 and FIG. 19 as follows.

The drain pan 250 unlike the related art is formed to be separated from the orifice 120.

Therefore, the constitution of the orifice 120 is simplified relatively.

Moreover, the pipe landing portion 255 is built in one body with the drain pan 255, thereby enabling to simplify the components constituting the indoor unit.

The drain pan 250 is installed in a manner that the screws penetrating into the coupling holes 256 are locked into the coupling ribs 27r of the outer case 20, respectively.

And, the pipe cover 257 is coupled with the coupling ribs 27r' of the outer case 20 while the power wire, various pipes, and the like are loaded in the pipe landing portion 255.

The drain pan portion 251 of the drain pan 250 gathers the condensed water generated from the heat exchanger 130.

Namely, the condensed water, which is generated from heat-exchange between the air and working fluid, falls to be gathered on the drain pan portion 251 installed under the heat exchanger, and then discharged outside through the drain hose(s) connected to the drain outlet(s) 253.

In this case, the drain outlets 253 extend to both rear sides of the drain pan portion 251 so as to be connected to the drain hoses selectively or simultaneously for drainage.

Therefore, the drain outlets 253 are formed at both sides so as to be selected suitably under installment circumstances of the air conditioner in order to carry out the drainage of the condensed water.

And, the drain pan 250 of the present invention is formed separate from the orifice 120, whereby a size of the orifice 120 can be relatively reduced in size to facilitate the fabrication of the orifice 120.

Thus, the drain pan 250 is made separate from the orifice 120 as well as built in one body with the pipe landing portion 955, thereby enabling to minimize the number of overall components. And, the pipe cover 257 is formed to be separated from the pipe landing portion 255 so as to close an upper part of the pipe landing portion 255.

Since the pipe landing portion 255 and the pipe cover 257 are formed separately, the pipe cover 257 is installed after the pipe or power wire has landed at the pipe landing portion 255.

And, the pipe cover 257 is coupled with the coupling ribs 27r' of the outer case 20 so as to help to make sure arrangement of the pipe, power wire, and the like mounted on the pipe landing portion 255.

Meanwhile, a vertically-bisected view of the outer case 20 of the present invention is a trapezoid, and one of the lateral faces 22 forming the upper face of the outer case 20 fails to form the blow unit landing space 23 for installment of the blow unit 160.

Therefore, the closed face of the lateral faces 22 reinforces the overall strength of the outer case 20.

Meanwhile, if the above-constituted outer case 20 is selected, in aspect of the front view of the air conditioner, it is able to formed the blow paths so that the air is blown through the right, left, and lower sides of the.

Besides, a plurality of the reinforcement ribs 210 formed at the base face 21 can reinforce the overall strength of the outer case 20 as well.

Moreover, the reinforcement plate 180, which is made of a metal material plate, loaded on the back face of the base face 21 has a predetermined width so as to be loaded on the upper to lower ends of the outer case 20 in order to prevent the outer case 20 from being distorted.

Specifically, the reinforcement plate 180 is loaded to reinforce the strength of the outer case 20, thereby enabling to improve the support strength for the components loaded on the base face 21 such as the motor 150, turbofan 154, and the like.

Meanwhile, the blow guides 170 guiding the air to the blow units 160 are built in one body with the outer case 20 according to the present invention.

Thus, the blow guides 170 built as one enables to reduce the number of components constituting the air conditioner overall.

Besides, the lead wire channels 171 are formed at the blow guides 170, thereby enabling to arrange neatly the lead wire existing inside the indoor unit.

INDUSTRIAL APPLICABILITY

As explained in the above description, the indoor unit of the air conditioner according to the present invention has the constitution enabling to blow the chilly air to the air-conditioned space through the blow outlets at the right, left, and upper sides of the outer case and suck the air in the air-conditioned space through the intake part at the front face of the outer case, thereby enabling to prevent the blown air from being sucked back instantly inside the indoor unit through the intake part.

And, the chilly air is blown from the blow outlets with directions so as to be delivered farther, whereby the setup temperature in the air-conditioned space can be achieved quickly.

Moreover, the blow outlets and intake part, through which the flow of air takes place between the inside and outside of the indoor unit, are open only when the indoor unit operates, thereby enabling to prevent particles such as external dust and the like from penetrating into the inside of the indoor unit.

Besides, when the air conditioner stops operating, the blow outlets and intake part are closed so that the inside of the indoor unit is unable to be seen from outside. Hence, the present invention enables to improve relatively the beauty of exterior of the indoor unit.

Meanwhile, in order to attach/detach the filter, the present invention needs not disassemble the base panel, grill louvers, or the like from the front panel.

Therefore, the present invention enables to facilitate the detachment/attachment of the filter more quickly.

Specifically, the present invention enables to detach/attach the filter by grabbing to move the handle at the lower end of the filter upward and downward, thereby enabling to carry out replacement of the filter while the indoor unit of the air conditioner is hung on the wall.

The filter of the present invention enables to remove smell as well as dust, and is assembled as one so as to be separable. Hence, the present invention facilitates the handling and maintenance of the filter.

The drain pan of the present invention is separated from the orifice. Hence, the present invention enables to simplify the constitution of the orifice. And, the pipe landing portion is built in one body with the drain pan, thereby enabling to simplify the overall components.

The drain outlets for drainage of the condensed water are formed at both ends of the drain pan so as to install the drain hoses selectively under installment circumstances of the air conditioner. Therefore, the present invention enables to install the air conditioner ith ease.

The display unit of the present invention transfers the light emitted from the light source to the light emitting part without light leakage, whereby a status of the display with the same output can be easily seen from a relatively farther position. And, the display unit has the constitution with simpler components and high assembling capability.

In the present invention, a single motor drives a plurality of the grill louvers so as to save the components. The overall constitution for driving the grill louvers is loaded inside the gear housing so as to be sent to an assembly line. Therefore, the present invention improves the productivity of the entire assembly works.

And, the driven gear is a circular arc type gear having gear teeth formed in part centering around the connecting shaft so as to have a relatively small width, thereby requiring a minimum installment space.

Therefore, the present invention enables to provide a slim-sized constitution of the air conditioner.

Moreover, the blow louvers driven by the driving source are separated from the blow guides giving directions to the air blow, thereby enabling to minimize power consumption. And all the blow units mounted on the blow unit landing spaces have the same constitution, whereby one species of the blow unit can be manufactured only.

A minimum coupling device is used for the installment of the blow unit, and the reset portions can be caught on or fitted into the outer case. Therefore, the present invention enables to reduce a production cost of the indoor unit.

In the present invention, the strength of the orifice is reinforced relatively so as to prevent the distortion and make the heat exchanger land precisely. Hence, the installment condition of the heat exchanger becomes strong so as to guide the flow of air more precisely.

Sides of the outer case expand for the strength reinforcement, a plurality of the reinforcement ribs are formed on the base face, and the additional reinforcement plate is loaded on the base face.

Therefore, the strength of the outer case is enhanced so as to prevent the distortion of the outer case due to the components installed inside.

Besides, the blow louvers are separated from the blow guides so that the driving source drives selectively the blow louvers closing/opening the blow outlets. Hence, the present invention enables to minimize power consumption. And, the blow guides support the blow grill as well, thereby enabling to reinforce the strength of the blow units.

Finally, the inner face of the blow louver according to the present invention has the same curvature overall, thereby enabling to make the air blown through the blow outlet smoother. And, the shut-off portion is formed at the outer face of the blow louver so that the inner face of the blow louver enables to guide the entire blown air. Hence, the present invention enables to perform the precise blow of the air.

Therefore, the present invention can be applied to industry very usefully.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. An indoor unit of an air conditioner, comprising:
    an outer case having sides and components installed inside;
    a front panel installed at a front side of the outer case and having an air intake part to be opened/closed; and
    blow units installed in the right, left and lower sides of the outer case respectively so as to permit a heat-exchanged air to be discharged to a space for air-conditioning.

2. The indoor air unit of claim 1,
    wherein the blow units are installed at right; left, and lower sides of the outer case and wherein each of the blow units comprises a blow grill forming a frame, a blow louver driven by an additional driving source so as to open/close the blow outlet selectively and guide a blown air to a front outside of the outer case, and a blow vane guiding the blown air from the blow outlet so that the blow air turns in one direction overall.

3. The indoor unit of claim 2, wherein the blow vane divides the blow outlet along its length direction.

4. The indoor unit of claim 2 or claim 3, wherein the blow vane is built in one body with the blow grill.

5. The indoor unit of claim 2, wherein an inner face of a louver body of the blow louver has a predetermined curvature from upper to lower stream portions of the louver body and wherein a vertical hem plane portion is formed at a vertical hem outer face of the louver body.

6. The indoor unit of claim 5, wherein a shut-off portion is formed at the outer face of the upper stream portion of the louver body so as to block a gap between the outer face of the louver body and the corresponding blow outlet when the blow louver is opened.

7. The indoor unit of claim 2, wherein blow unit landing spaces for receiving the blow units are formed at the sides of the outer case, respectively, and wherein hanging pieces and hanging protrusions are formed at each of the blow grills landing at the blow unit landing spaces and inner sides of the outer case, respectively so as to assemble each of the blow units with the outer case.

8. The indoor unit of claim 7, wherein a landing rest is formed at one side of the blow grill so as to land at a landing channel formed at the outer case.

9. An indoor unit of an air conditioner, comprising:
    an outer case having components installed inside;
    a front panel installed at a front side of the outer case;
    at least one grill louver installed on the front panel so as to be closed/opened to suck an air of an air-conditioned space inside;
    blow guides installed inside the outer case so as to guide an air to blow units wherein the air is sucked inside to be heat-exchanged when the grill louver is opened; and
    blow units installed in right, left, and lower directions of the outer case, respectively so as to blow externally the air guided by the blow guide.

10. The indoor unit of claim 9, wherein the blow guides are installed at a base face of the outer case, and wherein two of the blow guides are built in one body with both lower end sides of the base face and the rest blow guide is installed additionally at an upper end of the base face so as to extend long from one side to the other side.

11. The indoor unit of claim 10, wherein the blow guide at the upper end of the base face is made of Styrofoam based material so as to have a guide face having a predetermined curvature at a portion confronting a blow fan.

12. The indoor unit of claim 10, wherein a lead wire landing channel is formed at each of the blow guides built in one body with the base face so as to receive a lead wire thereon.

13. An indoor unit of an air conditioner, comprising:
    an outer case having components installed inside;
    a front panel installed at a front side of the outer case;

at least one grill louver installed on the front panel so as to be closed/opened to suck an air of an air-conditioned space inside;

a base panel installed under the grill louver so as to be able to elevate along the front panel, the base panel used as an access path for attaching/detaching a filter installed at a rear side of the grill louver; and blow units installed at right, left, and lower sides of the outer case, respectively so as to blow the air to the air-conditioned space wherein the air is sucked inside to be heat-exchanged when the grill louver is opened.

14. The indoor unit of claim 13, wherein guide pins are formed to protrude from both upper end sides of the base panel and wherein the guide pins move along guide slots formed at the front panel, respectively so as to guide elevation of the base panel.

15. The indoor unit of claim 14, wherein guides are formed at the base and front panels, respectively so as to guide the elevation of the base panel.

16. The indoor unit of claim 13 or claim 15, further comprising:

at least one locker penetrating into back and front faces of the front panel so as to support a back face of the base panel; and at least one locker loading part formed at the back face of the front panel so as to have the locker loaded thereon.

17. The indoor unit of claim 16, the locker comprising:

a support rod having one end protruding toward a front side of the front panel so as to support the base panel;

a landing body built in one body with the other end of the support rod so as to land at the locker loading part; and a plurality of coupling wings built in one body with a circumference of the landing body wherein hooks are formed at vertical hems of the coupling wings so as to be coupled with the locker loading part.

18. The indoor unit of claim 17, the locker loading part comprising:

a landing space at which the landing body lands;

a locking rib formed along an inner face of a guide rib forming the landing space to correspond to a number of the coupling wings so as to fix the coupling wings thereto; and a passing hole making the support rod protrude from the front face of the front panel.

19. The indoor unit of claim 18, wherein the guide rib is formed at the back face of the base panel.

20. The indoor unit of claim 13, further comprising a display unit at the base panel, the display unit comprising:

a housing coupled with a back face of the base panel;

at least one light source installed inside the housing so as to emit light;

a light traveling globe installed on a substrate landing inside the housing and loaded on the back face of the base panel so as to transfer the light of the light source;

a light guide globe installed on the substrate so as to guide the light emitted from the light source to the light traveling globe; and a light emitting part installed on the light traveling globe to be exposed to a front face of the base panel so as to provide a front side of the base panel with the light.

21. The indoor unit of claim 20, the light guide globe comprising:

a body portion having a light guide hole inside so as to have an exit of the light guide hole adhere closely to the light traveling globe; and loading legs built in one body with the body portion and having hooks at vertical hems of the loading legs, respectively so as to be loaded on the substrate elastically.

22. The indoor unit of claim 20, wherein the light source is installed at each end of the light traveling globe so as to form a plurality of colors with three primary colors of light and combinations thereof to be displayed on the display unit.

23. An indoor unit of an air conditioner, comprising:

an outer case having components installed inside;

a front panel installed at a front side of the outer case;

at least one grill louver installed on the front panel so as to be closed/opened to suck an air of an air-conditioned space inside;

a filter installed in rear of the grill louver so as to purify the air passing through the front panel, the filter moving upward and downward along a surface of the front panel so as to be detachable; and blow units installed at right, left, and lower sides of the outer case, respectively so as to blow the air to the air-conditioned space wherein the air is sucked inside to be heat-exchanged when the grill louver is opened.

24. The indoor unit of claim 23, the filter comprising:

an intake filter part having a filter portion inside a predetermined type intake filter frame so as to filter dust by letting the air pass through the filter portion wherein the air flows from the air-conditioned space to an inside of the air conditioner; and a deodorizing filter part built in one body with the intake filter frame so as to deodorize smell in the air.

25. The indoor unit of claim 24, the deodorizing part comprising:

a rear frame built in one body with the intake filter frame;

a front frame installed at the rear frame detachably so as to leave a predetermined space from the rear frame; and a deodorizing portion installed between the front and rear frames for deodorization.

26. The indoor unit of claim 25, in order to assemble the front and rear frames with each other, the filter further comprising:

front and rear coupling protrusion pieces protruding from both ends of the front and rear frames so as to have selectively coupling recesses and protrusions coupled with each other, respectively; and coupling cut portions and coupling pieces formed at the front and rear frames selectively so as to be coupled with each other.

27. The indoor unit of claim 24, wherein the filter is installed at an intake air vent part in the front panel and wherein a lattice type air vent frame is formed in the intake air vent part so as to support the filter.

28. The indoor unit of claim 27, wherein hanging protrusions are formed at an upper end of the intake filter frame so as to be installed at the front panel respectively and wherein a handle is formed at a lower end of the intake filter frame for detachment/attachment.

29. The indoor unit of claim 28, wherein a filter landing ends are formed along both ends of the intake air vent part of the front panel so as to guide to support both ends of the filter and wherein hanging portions are formed at positions corresponding to upper and lower ends of the filter so that one side of the filter is inserted therein to be hung.

30. The indoor unit of claim 29, in order to prevent interference between the handle of the filter and a base panel installed under a front lower end of the front panel, wherein an interference prevention part is formed at an inner upper end of the base panel.

31. An indoor unit of an air conditioner, comprising:
an outer case having components installed inside;
a front panel installed at a front side of the outer case;
at least one grill louver installed on the front panel so as to be closed/opened to suck an air of an air-conditioned space inside;
a grill louver driving unit opening/closing the grill louver in accordance with an operation status of the air conditioner; and
blow units installed at right, left, and lower sides of the outer case, respectively so as to blow the air to the air-conditioned space wherein the air is sucked inside to be heat-exchanged when the grill louver is opened.

32. The indoor unit of claim 31, the grill louver driving unit comprising:
a motor providing a driving force for driving the grill louver;
a gear housing installed at the front panel so as to have a landing space inside wherein the motor is loaded on the gear housing;
a driving gear installed in the gear housing so as to be driven by the driving force of the motor;
a rack gear bar landing at the landing space of the gear housing so as to operate by receiving the driving force through the driving gear; and
at least one driven gear installed at the gear housing and gearing into the rack gear bar so as to transfer the driving force of the motor to the grill louver.

33. The indoor unit of claim 32, wherein the driven gear is a circular arc type gear having teeth on a partial section thereof.

34. An indoor unit of an air conditioner, comprising:
an outer case having components installed inside;
a front panel installed at a front side of the outer case;
at least one grill louver installed on the front panel so as to be closed/opened to suck an air of an air-conditioned space inside;
blow guides installed inside the outer case so as to guide the air to blow units wherein the air is sucked inside to be heat-exchanged when the grill louver is opened;
a filter installed in rear of the grill louver so as to purify the air passing through the front panel, the filter moving upward and downward along a surface of the front panel so as to be detachable;
a base panel installed under the grill louver so as to be able to elevate along the front panel, the base panel used as an access path for attaching/detaching the filter installed in rear of the grill louver; and
blow units installed at right, left, and lower sides of the outer case, respectively so as to blow the air to the air-conditioned space wherein the air is sucked inside to be heat-exchanged when the grill louver is opened.

35. The indoor unit of claim 34, further comprising a grill louver driving unit for opening/closing the grill louver automatically.

36. The indoor unit of claim 35, the grill louver driving unit comprising:
a motor providing a driving force for driving the grill louver;
a gear housing installed at the front panel so as to have a landing space inside wherein the motor is loaded on the gear housing;
a driving gear installed in the gear housing so as to be driven by the driving force of the motor;
a rack gear bar landing at the landing space of the gear housing so as to operate by receiving the driving force through the driving gear; and
at least one driven gear installed at the gear housing and gearing into the rack gear bar so as to transfer the driving force of the motor to the grill louver.

* * * * *